(12) United States Patent
Boutaud

(10) Patent No.: US 9,857,218 B2
(45) Date of Patent: Jan. 2, 2018

(54) PULSED SENSING USING MULTIPLE PULSE SAMPLES

(71) Applicant: Rockwell Automation Technologies, Inc., Mayfield Heights, OH (US)

(72) Inventor: Frederic Boutaud, Lexington, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 241 days.

(21) Appl. No.: 14/642,687

(22) Filed: Mar. 9, 2015

(65) Prior Publication Data

US 2016/0265968 A1    Sep. 15, 2016

(51) Int. Cl.
*G01J 1/44* (2006.01)
*G01S 7/487* (2006.01)
(Continued)

(52) U.S. Cl.
CPC ............... *G01J 1/44* (2013.01); *G01S 7/487* (2013.01); *G01S 7/4868* (2013.01);
(Continued)

(58) Field of Classification Search
CPC ...... G01J 11/00; G01J 1/42; G01J 1/44; G01J 2001/4238; G01S 7/483; G01S 7/486;
(Continued)

(56) References Cited

U.S. PATENT DOCUMENTS 4,473,296 A * 9/1984 Shofner ................. G01N 21/53
356/336
4,972,441 A * 11/1990 Roberts ................. G01S 7/292
375/342
(Continued)

FOREIGN PATENT DOCUMENTS

EP    2442135 A1    4/2012
EP    2581759 A1    4/2013

OTHER PUBLICATIONS

European Office Action for EP Patent Application Serial No. 16159394.2, dated Sep. 19, 2016, 2 pages.
"Photoswitch® Photoelectric Sensors", Rockwell Automation, Inc., 2014, retrieved on Jun. 18, 2015, 18 pages.
Extended European Search Report for EP Patent Application Serial No. 16159394.2, dated Jul. 20, 2016, 7 pages.
(Continued)

*Primary Examiner* — Que T Le
*Assistant Examiner* — Jennifer Bennett
(74) *Attorney, Agent, or Firm* — Amin, Turocy & Watson, LLP

(57) ABSTRACT

The disclosed subject matter comprises a sensor management component (SMC) that facilitates accurately determining a desired switching state of a sensor and controlling the switching state of the sensor to reduce unwanted effects of ambient noise. The SMC samples pre-pulses, pulses, and post-pulses of a signal transmitted from a transmitter of the sensor, determines level of ambient noise associated with the signal based on levels of the pre-pulse sample and the post-pulse sample, and determines the pulse amplitude as a function of the pulse level and the levels of the pre-pulse and post-pulse samples to facilitate accurate state determinations for the sensor. The SMC can determine the state the sensor is to be in at a given time based on the number of good pulses received. The SMC can employ linear or non-linear filtering to remove spike or random noise to further facilitate accurate state determinations for the sensor.

29 Claims, 19 Drawing Sheets

(51) Int. Cl.
*G01S 7/486* (2006.01)
*G01S 17/02* (2006.01)
*G05B 19/042* (2006.01)
*G01J 1/42* (2006.01)

(52) U.S. Cl.
CPC .......... *G01S 17/026* (2013.01); *G05B 19/042* (2013.01); *G01J 2001/4238* (2013.01); *G05B 2219/37283* (2013.01)

(58) Field of Classification Search
CPC ...... G01S 7/487; G01S 7/4858; G01S 17/026; G05B 19/042; G05B 2219/37283; H04B 10/691; H04B 10/152; H04B 1/7174; H04B 7/17; G02B 6/3598; H01S 3/00; H04L 25/03834
USPC ... 250/214 R, 214.1, 214 A, 214 C, 214 DC; 356/5.05, 5.03; 73/204.14
See application file for complete search history.

(56) References Cited

U.S. PATENT DOCUMENTS

| | | | |
|---|---|---|---|
| 6,115,112 A * | 9/2000 | Hertzman | G01S 7/487 356/5.01 |
| 6,160,259 A * | 12/2000 | Petrillo | G01T 1/171 250/363.02 |
| 6,208,445 B1 | 3/2001 | Reime | |
| 6,775,482 B1 | 8/2004 | Shimomura et al. | |
| 2015/0153223 A1* | 6/2015 | Onishi | G01J 1/42 250/214 A |

OTHER PUBLICATIONS

Non-Final Office Action from U.S. Appl. No. 15/186,939 dated Sep. 27, 2016, 18 pages.

* cited by examiner

… (1)

PULSED SENSING USING MULTIPLE PULSE SAMPLES

TECHNICAL STATEMENT

The subject disclosure generally relates to sensors, e.g., to pulsed based sensing.

BACKGROUND

Sensors can be used for a variety of purposes in connection with industrial manufacturing and industrial automation systems. For instance, sensors (e.g., photoelectric sensors) can be employed for a variety of different applications that can be found in a variety of industries, such as material handling, packaging, food processing, transportation, logistics, construction, and semiconductor manufacturing.

With regard to photoelectric sensors, a photoelectric sensor essentially can be viewed as a switch, wherein the mechanical actuator or lever arm function of the switch is replaced with a beam of light. Photoelectric sensors can operate by sensing a change in the amount of light received by a photodetector of the sensors, wherein the detected change in light can allow a sensor to detect the presence or absence of an object, and/or detect a size, a shape, reflectivity, opacity, translucence, or color, of the object. Photoelectric sensors can provide accurate detection of objects without physical contact with the objects.

The above-described description is merely intended to provide a contextual overview relating to sensors, and is not intended to be exhaustive.

SUMMARY

The following presents a simplified summary in order to provide a basic understanding of some aspects of the subject disclosure. This summary is not an extensive overview, and it is not intended to identify key/critical elements of the subject disclosure or to delineate any scope. The sole purpose of this summary is to present some concepts in a simplified form as a prelude to the more detailed description that is presented later.

In accordance with various aspects, the disclosed subject matter can comprise a system that comprises a memory that stores computer-executable components; and a processor, operatively coupled to the memory, that executes computer-executable components. The computer-executable components can comprise a sensor component that is transitioned between an off state and an on state based at least in part on a pulse signal received by the sensor component. The computer-executable components can comprise a sensor management component that determines a pulse amplitude of a pulse in the pulse signal as a function of a pulse sample amplitude and at least one of a pre-pulse sample amplitude or a post-pulse sample amplitude, and controls the transition of the sensor component between the off state and the on state based at least in part on the pulse amplitude of the pulse.

In accordance with various other aspects, the disclosed subject matter can comprise a method, comprising: determining pulse sample value and at least one of a pre-pulse sample value or a post-pulse sample value that are associated with a portion of a pulse signal received in connection with a sensor, wherein the portion of the pulse signal comprises a pulse period that contains a pulse or a pulse absence; and determining a pulse value of the pulse or a pulse absence value of the pulse absence as a function of the pulse sample value and the at least one of the pre-pulse sample value or the post-pulse sample value, to facilitate determining a state in which the sensor is to be in response to the pulse or the pulse absence.

In accordance with still other aspects, the disclosed subject matter can comprise a non-transitory computer-readable medium storing instructions that, in response to execution, cause a system comprising a processor to perform operations. The operations can comprise determining a pulse sample level and at least one of a pre-pulse sample level or a post-pulse sample level that are associated with a portion of a pulse signal received in connection with a sensor, wherein the portion of the pulse signal comprises a pulse period in which a pulse or a pulse absence is able to occur. The operations also can comprise determining a pulse level of the pulse or a pulse absence level of the pulse absence based at least in part on the pulse sample level, the pre-pulse sample level, and the post-pulse sample level, to facilitate determining a state in which the sensor is to be in response to the pulse or the pulse absence.

To the accomplishment of the foregoing and related ends, certain illustrative aspects of the disclosed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
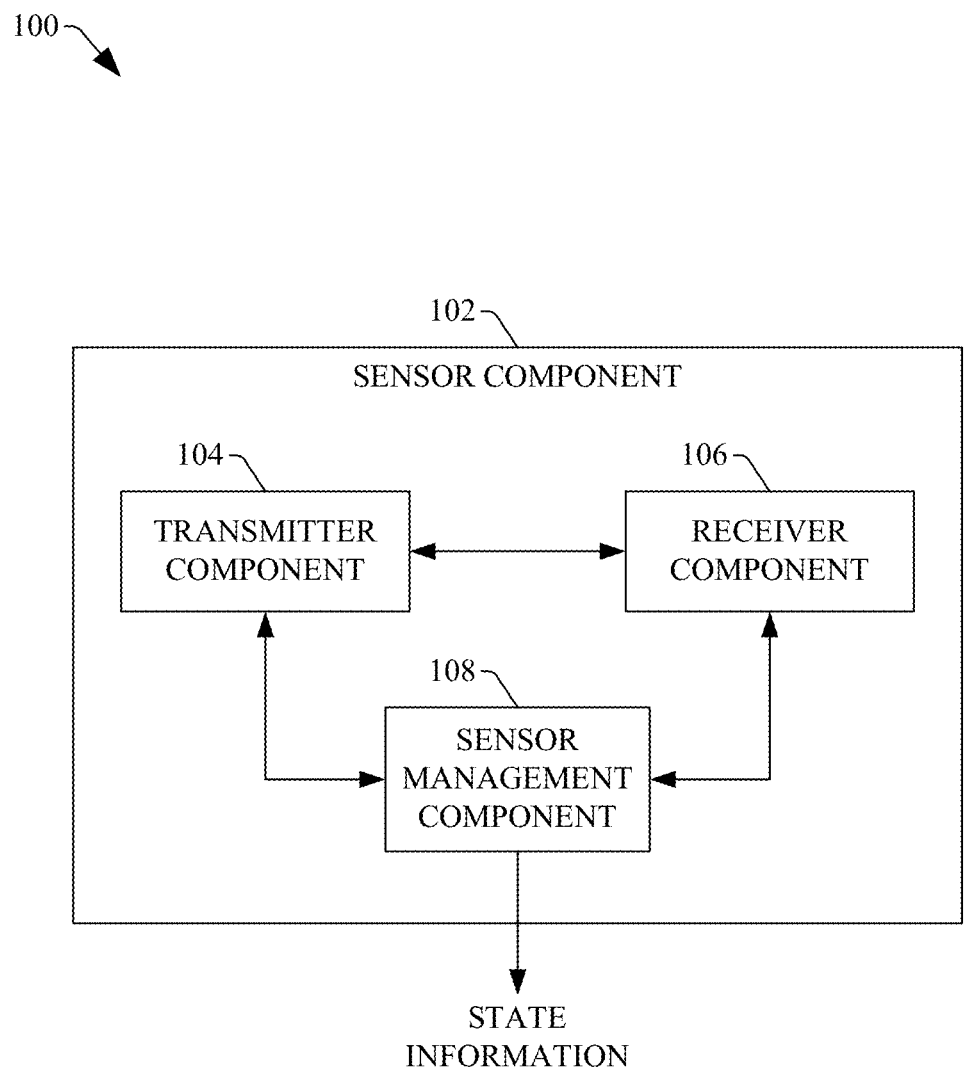
FIG. 1 illustrates a block diagram of an example system that can control the operation and state of a sensor component, in accordance with various aspects and embodiments of the disclosed subject matter.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

A photoelectric sensor essentially can be viewed as a switch, wherein the mechanical actuator or lever arm function of the switch is replaced with a beam of light. Photoelectric sensors can operate by sensing a change in the amount of light received by a photodetector of the sensors, wherein the detected change in light can allow a sensor to detect the presence or absence of an object, and/or detect a size, a shape, reflectivity, opacity, translucence, or color, of the object. Photoelectric sensors can provide accurate detection of objects without physical contact with the objects.

Conventionally, with some types of photoelectric sensors, a photoelectric sensor can transmit light that can be received by a receiver (e.g., a receiver of the sensor) to facilitate switching the photoelectric sensor to or maintaining the sensor in an on state, wherein, at times, the receiver may detect (e.g., perceive) a change in the light signal due to the presence of an object or target that can cause a change in (e.g., an absence or a diminution of) the light signal (e.g., by the object or target being in the path of the light signal), and, in response, the receiver can facilitate switching the sensor to or maintaining the sensor in an off state. For instance, a photoelectric sensor can employ a transmitter that transmits light (or does not transmit light) to a target, which can be the receiver (directly) or can be a reflector that reflects the light back to the receiver (e.g., a receiver of the sensor), wherein the receiver detects the presence or absence of light from the transmitter. This is but one example of conventional sensors. More generally, a photoelectric sensor can transmit light, wherein the light signal characteristics (e.g., amplitude) of the light may be modified if a target is present or may not be modified if a target is not present, and the receiver can detect the light signal characteristics of the light (e.g., as modified or not) and can determine whether the target is present or not based at least in part on the light signal characteristics (e.g., based on whether the light signal has been modified or not).

A problem that photoelectric sensors may encounter can be undesirable noise, such as ambient light signals, that can come from other sources and can be received by the receiver. This undesirable noise can negatively impact the ability of the receiver to accurately determine the light signal level of the light being transmitted by the sensor to the receiver. This can result in the receiver making false determinations regarding the state (e.g., on state, off state) the sensor is supposed to be in at a given time.

One conventional way of trying to reduce false determinations regarding the state a sensor is supposed to be in at a given time is to have the receiver count the number of pulses (e.g., light pulses) being transmitted by the transmitter of the sensor (e.g., photoelectric sensor), and if the receiver receives a specified number (e.g., 5) of good pulses in a row, the receiver can determine that the signal is good enough to decide that the sensor is to be in the on state. If the receiver receives less than the specified number of good pulses in a row, the receiver can determine that the signal is not good enough to decide the switch state in which the sensor should be. Conversely, the receiver can count the number of absences of pulses from the transmitter, and if the receiver determines the absence of a specified number (e.g., 5) of pulses in a row is good (e.g., the absent pulses are determined to be good absent pulses by the receiver), the receiver can determine that the absence of signal is good enough to determine that the sensor is to be in the off state. While this conventional approach may potentially reduce somewhat the negative impact ambient noise (e.g., light noise, electromagnetic or radio frequency noise (e.g., electromagnetic or radio frequency waves), vibrations, electrostatic discharge, or electronic or electrical noise) has on sensors, there can still be an undesirable level of false determinations regarding the state (e.g., on state, off state)

that the sensor is supposed to be in at a given time due to the ambient noise, due to, for example, an undesirably noisy (e.g., very noisy) environment.

The disclosed subject matter comprises a sensor management component that can facilitate accurately determining a desired sensor state (e.g., on state, off state) of a sensor component (e.g., a photoelectric sensor component) and controlling the switching state of the sensor component to reduce unwanted effects of ambient light noise or any other types of noise. The sensor component can comprise a transmitter component that can transmit a sequence of pulses (e.g., light pulses) to a receiver component associated with (e.g., directly or indirectly aligned with) the transmitter component, wherein the receiver component can receive (e.g., detect) the pulses (e.g., when no target or object is present) or can detect pulse absences (e.g., when a target or an object is present to interfere with, obscure, or otherwise modify a pulse), to facilitate switching the sensor component between an on state (e.g., in response to pulses) or an off state (e.g., in response to detecting the absence or modification of pulses). The sensor management component can sample the levels (e.g., amplitudes) of the pre-pulses (or pre-pulse absences), pulses (or pulse absences), and post-pulses (or post-pulse absences) of at least a portion of a pulse signal (e.g., a pulse signal sequence) being transmitted from the transmitter component. For each pulse or pulse absence, the sensor management component can determine the level of ambient noise (e.g., ambient light noise or other noise) associated with the pulse or pulse absence based at least in part on the levels of the pre-pulse sample and the post-pulse sample, wherein the pre-pulse sample can be associated with a pre-pulse or a pre-pulse absence, and the post-pulse sample can be associated with a post-pulse or a post-pulse absence. The sensor management component can determine the amplitude of the pulse or pulse absence as a function of the level of the pulse sample and the levels of the pre-pulse sample and post-pulse sample to facilitate accurately determining the state the sensor component is to be in at a given time in connection with the pulse or pulse absence (e.g., in connection with a subset of pulses or pulse absences, comprising the pulse or pulse absence).

The sensor management component also can track the levels (e.g., amplitude, value) of pulses or pulse absences, and the levels of respectively associated pre-pulses (or pre-pulse absences) and post-pulses (or post-pulse absences), in the sequence of pulses or pulse absences to facilitate determining a state the sensor is to be in at a given time. For instance, the sensor management component can count a number of pulses (or pulse absences) (e.g., a number of consecutive pulses (or pulse absences) in a row) that are received by a receiver component of the sensor to facilitate determining whether the sensor is to remain in a current state or is to be switched to a different state. For instance, the sensor management component can determine that the sensor component is to be in or transitioned to an on state if the sensor management component determines that the number of good pulses relating to (e.g., indicative of) an on state received (e.g., in a row) by the receiver component satisfies a defined sensor state criterion (e.g., 4 good pulses in a row are received by the receiver component, 5 good pulses in a row are received by the receiver component, or another desired number of good pulses in a row are received by the receiver component). The sensor management component also can determine that the sensor component is to be in or transitioned to an off state in response to the sensor management component determining that the number of good pulse absences (e.g., good pulse absences) relating to (e.g., indicative of) an off state received (e.g., in a row) by the receiver component satisfies the defined sensor state criterion.

In some implementations, the sensor management component can employ linear filtering or non-linear filtering, or a combination thereof, to remove spike or random noise (e.g., light noise or other noise) from a pulse signal (e.g., from a pulse or pulse absence in the pulse signal) to further facilitate accurate state determinations for the sensor. For instance, in addition to tracking and analyzing the levels of pulses or pulse absences, and respective pre-pulses (or pre-pulse absences) and post-pulses (or post-pulse absences), in a sequence of pulses or pulse absences, the sensor management component can employ non-linear filtering to identify any pulse(s) or pulse absence(s) that is an outlier pulse(s) or pulse absence(s) from other pulses or pulse absences in a subset of pulses or pulse absences in the pulse sequence. The sensor management component can remove the outlier pulse(s) or outlier pulse absence(s) from the subset or modify the amplitude of the outlier pulse(s) or outlier pulse absence(s) to correspond or substantially correspond with the amplitudes of the good pulses or pulse absences in the subset of pulses or pulse absences (e.g., modify the amplitude to have a value that is equal to the average amplitude value of the good pulses or pulse absences in the subset). This can facilitate accounting for high frequency noise (e.g., mitigating the effects of high frequency noise), such as spike or random light noise, in the pulse sequence by the sensor management component, which can enable the sensor management component to further improve accurately determining pulse or pulse absence levels, accurately determining the state the sensor component is to be in at a given time in response to a subset of pulses or pulse absences, and reducing or minimizing instances of false determinations regarding the state (e.g., on state, off state) that the sensor is supposed to be in at a given time. As a result, the sensor component can be more immune to noise and can have improved noise rejection as compared to conventional sensors.

FIG. 1 illustrates a block diagram of an example system 100 that can control the operation and state (e.g., sensor state) of a sensor component (e.g., a photoelectric sensor), in accordance with various aspects and embodiments of the disclosed subject matter. The system 100 can comprise a sensor component 102 that can transition or switch between states (e.g., on state, off state) based at least in part on light pulses. The sensor component 102 can be utilized for a variety of purposes in connection with industrial manufacturing and industrial automation systems, or in connection with other types of systems. For example, the sensor component 102 (e.g., photoelectric sensor(s)) can be employed for a variety of different applications that can be found in a variety of industries, such as material handling, packaging, food processing, transportation, logistics, construction, and semiconductor manufacturing. In some implementations, the sensor component 102 can employ pulse light modulation and/or synchronous detection to facilitate operation of the sensor component 102. The sensor component 102 can comprise, for example, a dual transducer system that can comprise transmit and receive functions. The sensor component 102 can be or can comprise, for example, one or more of a light sensor, a light emitting diode (LED) sensor, an infra-red sensor, a photodiode, a photoelectric sensor, a photoswitch, a diffuse sensor, or a polarized retro reflective sensor. In accordance with various implementations of the disclosed subject matter, the sensor component 102 can be software-based, wherein, for example, the sensor component can comprise a processor that can execute software and/or firmware to facilitate operation and perform the functions of the sensor component 102; and/or the sensor component 102 can be more hardware-based, wherein, for example, the sensor component 102 can comprise hardware (e.g., hardware sub-components), which can employ hardcoded logic (e.g., logic gates and a hardware state machine), that can facilitate operation and perform various functions of the sensor component 102.

The sensor component 102 can comprise a transmitter component 104 that can generate and transmit light pulses, for example, in a light pulse sequence, to facilitate changing the state (e.g., on state, off state, or other sensor state) of the sensor component 102 or maintaining the sensor component 102 in a desired state. For instance, the transmitter component 104 can transmit a subset of light pulses (e.g., towards a receiver component 106 or reflector component associated with the receiver component 106), wherein each pulse can be transmitted at a defined time, to facilitate switching the sensor component 102 to, or maintaining the sensor component 102 in, a first state (e.g., on state (or other sensor state)). When an object or target is present with respect to the sensor component 102 (e.g., when an object or target interferes with the transmission of light pulses from the transmitter component 104 to the receiver component 106), the receiver component 106 can detect a subset of absences of light pulses during the defined times that the light pulses are transmitted, and, in response, the sensor component 102 can be switched to or maintained in a second state (e.g., off state (or other sensor state)).

The sensor component 102 can be switched or placed in a desired state of a set of states available on the sensor component 102 based at least in part on whether or not an object is detected and/or other attributes of an object. The set of states can comprise an on state, an off state, or one or more other sensor states. For example, depending on the type of sensor(s) employed by the sensor component 102, the sensor component 102 can be in an on state when the presence of an object is detected by the sensor component 102 and an off state when absence of an object is detected by the sensor component, or the sensor component 102 can be in an off state when the presence of an object is detected by the sensor component 102 and an on state when absence of an object is detected by the sensor component. As another example, depending on the type of sensor(s) employed by the sensor component 102, the sensor component 102 can be in one of a desired number of different sensor states based at least in part on detection of one or more attributes of an object, wherein the one or more attributes can comprise a size, a shape, a reflectivity, an opacity, a translucence, a color, and/or other attribute of the object. For instance, with regard to the size attribute, depending on the type of sensor, the sensor component 102 can comprise an off state (or on state) to indicate absence of an object and a desired number of on states (off states), wherein, for example, a first on state (or first off state) can indicate that the presence of an object having a first size has been detected by the sensor component 102, a second on state (or second off state) can indicate that the presence of an object having a second size has been detected by the sensor component 102, a third on state (or third off state) can indicate that the presence of an object having a third size has been detected by the sensor component 102, and so on. The sensor component 102 can utilize similar types of sets of sensor states with regard to the other attributes (e.g., an off state and four on states, wherein the four on states correspond to four different shapes that can be detected for the object; an off state and five on states, wherein the five on states correspond to five different colors that can be detected for the object) and/or a set of sensor states can based at least in part on two or more attributes (e.g., size and shape of the object, shape and color of the object, size and reflectivity of the object, etc.)

In some implementations, the transmitter component 104 can comprise an emitter, such as, for example, a light-emitting diode (LED), red LED, or a red laser, that can generate light pulses following electrical pulse signals from a sensor management component 108 (e.g., which can be part of a microcontroller unit (MCU)). The intensity of the pulses can be controlled by the sensor management component 108, or by a digital-to-analog component (not shown in FIG. 1), or by logic signals that can control the emitter (e.g., LED) current. The shape of the pulses (e.g., pulse duration, pulse time period, or other shape parameters) can be defined parameters that can be loaded into a timer component (not shown in FIG. 1) and/or controlled by the sensor management component 108.

The receiver component 106 of the sensor component 102 can be associated with (e.g., directly or indirectly in alignment with) the transmitter component 104. The receiver component 106 also can be associated with (e.g., connected to) the sensor management component 108, which can be associated with (e.g., connected to) the transmitter component 104. The receiver component 106 can receive or detect the light pulses output from the transmitter component 104 or absences of light pulses from the transmitter component 104 when an object or target is present with respect to the sensor component 102. In some implementations, the receiver component 106 can be aligned with (e.g., directly aligned with) or coupled with the transmitter component 104 such that the light pulses generated by the transmitter component 104 can be beamed to and received by the receiver component 106. For instance, the emitter of the transmitter component 104 can be coupled or aligned with a photodiode (not shown in FIG. 1) or other receiver or detector of the receiver component 106. For example, the receiver component 106 can comprise the photodiode (or other receiver or detector) coupled to a trans-impedance amplifier (TIA) (not shown in FIG. 1). The sensor management component 108 can filter the output of the amplifier (e.g., TIA) for anti-aliasing and can convert the amplifier output (e.g., an analog signal) to digital samples (e.g., using an analog-to-digital converter (ADC) component in or associated with the sensor management component 108).

In other implementations, the receiver component 106 can be aligned with (e.g., indirectly aligned with) the transmitter component 104 such that the light pulses generated by the transmitter component 104 can be beamed to a reflector component (e.g., a mirror or reflector) (not shown in FIG. 1) that can be aligned with the transmitter component 104. The reflector component can be aligned with the receiver component 106 and can reflect the light pulses to the receiver component 106 to facilitate reception and detection of the light pulses by the receiver component 106.

Figure 2:
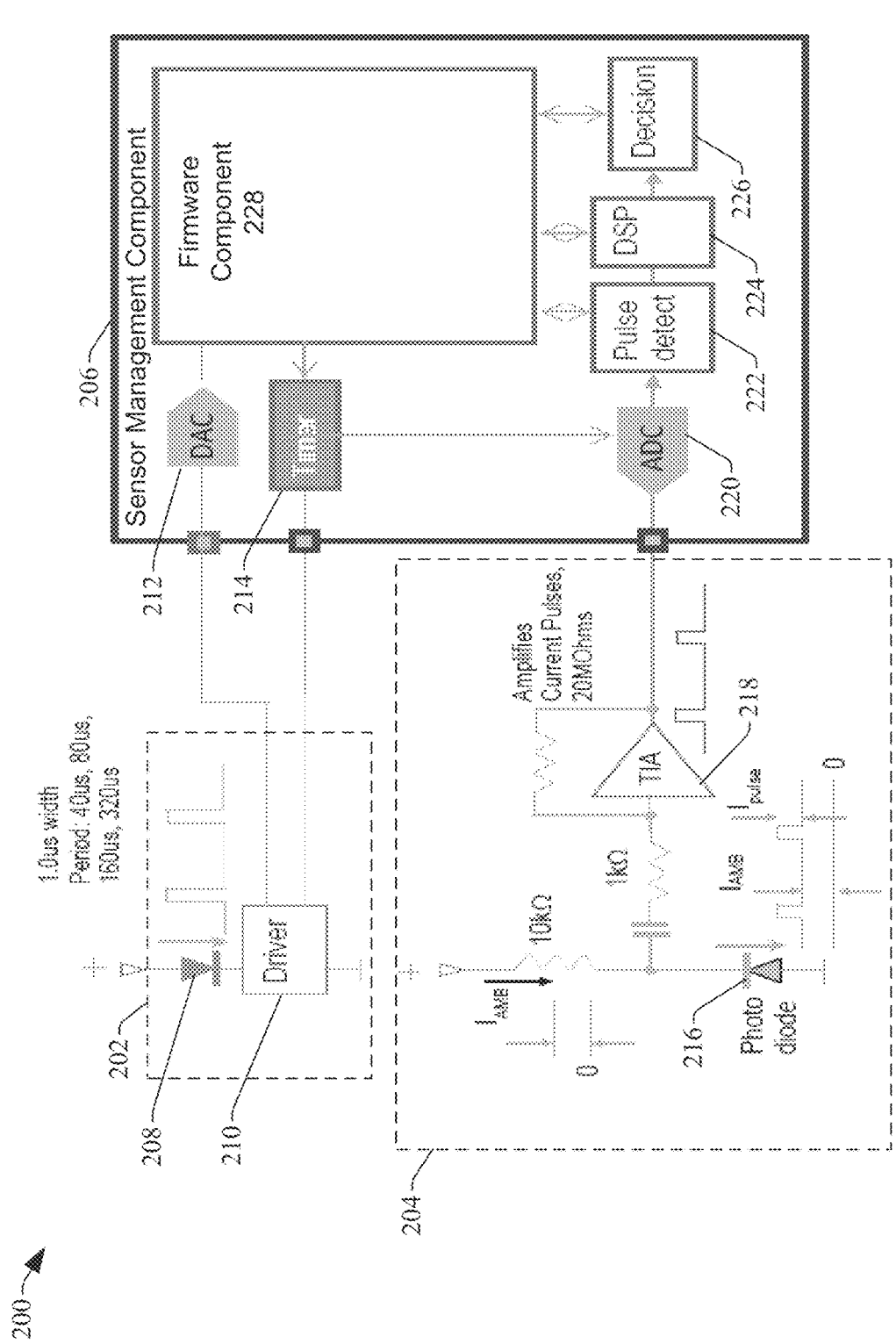
FIG. 2 depicts a functional block diagram of an example sensor component that can perform sensing operations and transition between states (e.g., on state, off state), in accordance with various aspects and embodiments of the disclosed subject matter.

Referring briefly to FIG. 2 (in connection with FIG. 1), FIG. 2 depicts a functional block diagram of an example sensor component 200 (e.g., a photoelectric sensor) that can perform sensing operations and transition between states (e.g., on state, off state), in accordance with various aspects and embodiments of the disclosed subject matter. The sensor component 200 can comprise a transmitter component 202 that can transmit light pulses, a receiver component 204 that can receive or detect light pulses or absence of pulses from the transmitter component 202, and a sensor management component 206 that can be associated with the transmitter component 202 and receiver component 204, and can perform various functions and control operations associated with the sensor component 200.

The transmitter component 202 can comprise an emitter component 208 (e.g., LED emitter, red LED emitter, red laser emitter, or other type of emitter) that can be associated with a driver component 210. The emitter component 208 can emit light pulses based at least in part on a clock signal received by the transmitter component 202. The driver component 210 can facilitate presenting the light pulses as an output from the transmitter component 202.

The emitter component 208 can generate light pulses following electrical pulse signals from the sensor management component 206 (e.g., which can be part of an MCU). The intensity of the pulses can be controlled by the sensor management component 206 (e.g., by a digital-to-analog converter (DAC) component 212 of the sensor management component 206), or by logic signals that can control the emitter (e.g., LED) current. The shape of the pulses (e.g., pulse duration, pulse time period, or other shape parameters) can be defined parameters that can be loaded into a timer component 214 and/or controlled by the sensor management component 206, wherein the timer component 214 can be part of the sensor management component 206 and can be associated with the driver component 210 to facilitate the shaping of the pulses.

The emitter component 208 can be coupled or aligned with a photodiode component 216 (or other receiver or detector) of the receiver component 204. In some implementations, the receiver component 204 can comprise the photodiode component 216 (e.g., comprising a photodiode(s)), which can be associated with (e.g., coupled to) an amplifier component 218 (TIA). The sensor management component 206 can filter the output of the amplifier component 218 for anti-aliasing and can convert the amplifier output (e.g., an analog signal) to digital samples (e.g., using an ADC component 220 that can be part of the sensor management component 206). The ADC component 220 can be associated with the timer component 214 to receive the timing signal and/or parameters to facilitate converting analog signals (e.g., analog samples of the received or detected signal from the transmitter component 202) to digital signals (e.g., digital samples).

The sensor management component 206 also can comprise a pulse detector component 222 that can detect pulses (e.g., light pulses) or the absence of pulses in the signal received or detected by the receiver component 204. The pulse detector component 222 can be associated with (e.g., coupled to) the ADC component 220 to receive the digital samples output from the ADC component 220 to facilitate detecting the pulses (and pre-pulses and post-pulses) in the received or detected signal.

The sensor management component 206 can include a digital signal processor (DSP) component 224 that can be associated with the pulse detector component 222, can receive the output (e.g., digital pulse detection information) from the pulse detector component 222, and can perform desired digital signal processing functions or tasks on digital signals (e.g., digital pulse detection information). The sensor management component 206 also can comprise a decision component 226 that can be associated with (e.g., coupled to) the DSP component 224. The decision component 226 can receive the processed digital signals from the DSP component 224, and can make decisions or determinations regarding whether the target is present or not (e.g., whether a good target pulse(s) is present or not), based at least in part on the processed digital signals.

The sensor management component 206 also can comprise a firmware component 228 that can be associated with various components of the sensor management component 206, including the DAC component 212, timer component 214, pulse detector component 222, DSP component 224, decision component 226, etc. The firmware component 228 can comprise firmware, comprising program code and/or other data, (e.g., stored in a memory of the firmware component 228) that can be employed by the various components of the sensor management component 206 to facilitate enabling the various components to perform the respective functions of those various components of the sensor management component 206. A processor component (e.g., processor, microprocessor, DSP) (not shown in FIG. 2) can execute the code of the firmware component 228 to facilitate performing the various functions of the sensor management component 206. The firmware stored in the firmware component 228 can be updated or modified, as desired.

In some implementations (e.g., as depicted in FIG. 2), the sensor management component 206 can comprise hardware functions and firmware/software functions. For instance, the DAC component 212, timer component 214, and ADC 220 can be hardware-based (e.g., hardware functions) that can perform their respective functions, and the pulse detector component 222, DSP component 224, and/or decision component 226 can comprise firmware or software that can be employed to facilitate performing the respective functions of those components (e.g., when acted on by a processor of the sensor component 200), wherein, for example, the pulse detector component 222, DSP component 224, and/or decision component 226 can be viewed as firmware or software blocks. In other implementations, sensor management component 206, including the pulse detector component 222, DSP component 224, and/or decision component 226, can be configured with logic gates, hard coded logic, and/or programmable hardware (e.g., a programmable DSP for the DSP component 224).

It is to be appreciated and understood that while the sensor component 200 in FIG. 2 is depicted with certain component values (e.g., 10 kΩ resistor and 1 kΩ resistor in the receiver component 204) and certain time values (e.g., 40 μs, 80 μs, 160 μs, 320 μs), those component values and time values are merely exemplary values, and the disclosed subject matter is not so limited, as other desired component values and other desired time values can be employed in or by the sensor component 102, in accordance with various aspects and implementations.

With further regard to FIG. 1, the sensor management component 108 can facilitate accurately determining a desired operational or switching state (e.g., on state, off state) of the sensor component 102 and controlling the state of the sensor component 102, based at least in part on the light pulses or absence of pulses in the pulse sequence, to facilitate reducing unwanted effects of ambient light noise (e.g., reducing or minimizing false pulse level determinations and/or false state determinations that can otherwise be caused by undesirable ambient light noise). The sensor management component 108 can sample the levels (e.g., amplitudes) of the pre-pulses, pulses (or absence of pulses), and post-pulses of a pulse signal (e.g., a sequence of light pulses or absence of pulses) received by the receiver component 106 from the transmitter component 104. For each pulse instance (e.g., instance of a light pulse, or instance of an absence of pulse) in the sequence, the sensor management component 108 can determine the level of ambient light (e.g., ambient light noise) based at least in part on the levels of the pre-pulse sample and/or the post-pulse sample. For example, the sensor management component 108 can determine or measure the level (e.g., amplitude) of the pre-pulse sample and the level of the post-pulse sample. The sensor management component 108 can determine or measure the amplitude of the pulse or absence of pulse as a function of the level of the pulse sample and the levels of the pre-pulse and post-pulse samples to facilitate accurately determining the state the sensor component is to be in at a given time associated with the pulse or absence of pulse. In some implementations, the sensor management component 108 can determine or measure the amplitude of the pulse or absence of pulse by determining the amplitude of the pulse sample, determining the average amplitude of the pre-pulse sample and the post-pulse sample (e.g., by adding the amplitudes of the pre-pulse and post-pulse samples and dividing that total by 2), and subtracting the average amplitude of the pre-pulse and post-pulse samples from the pulse sample to determine or calculate the amplitude of the pulse.

Figure 3:
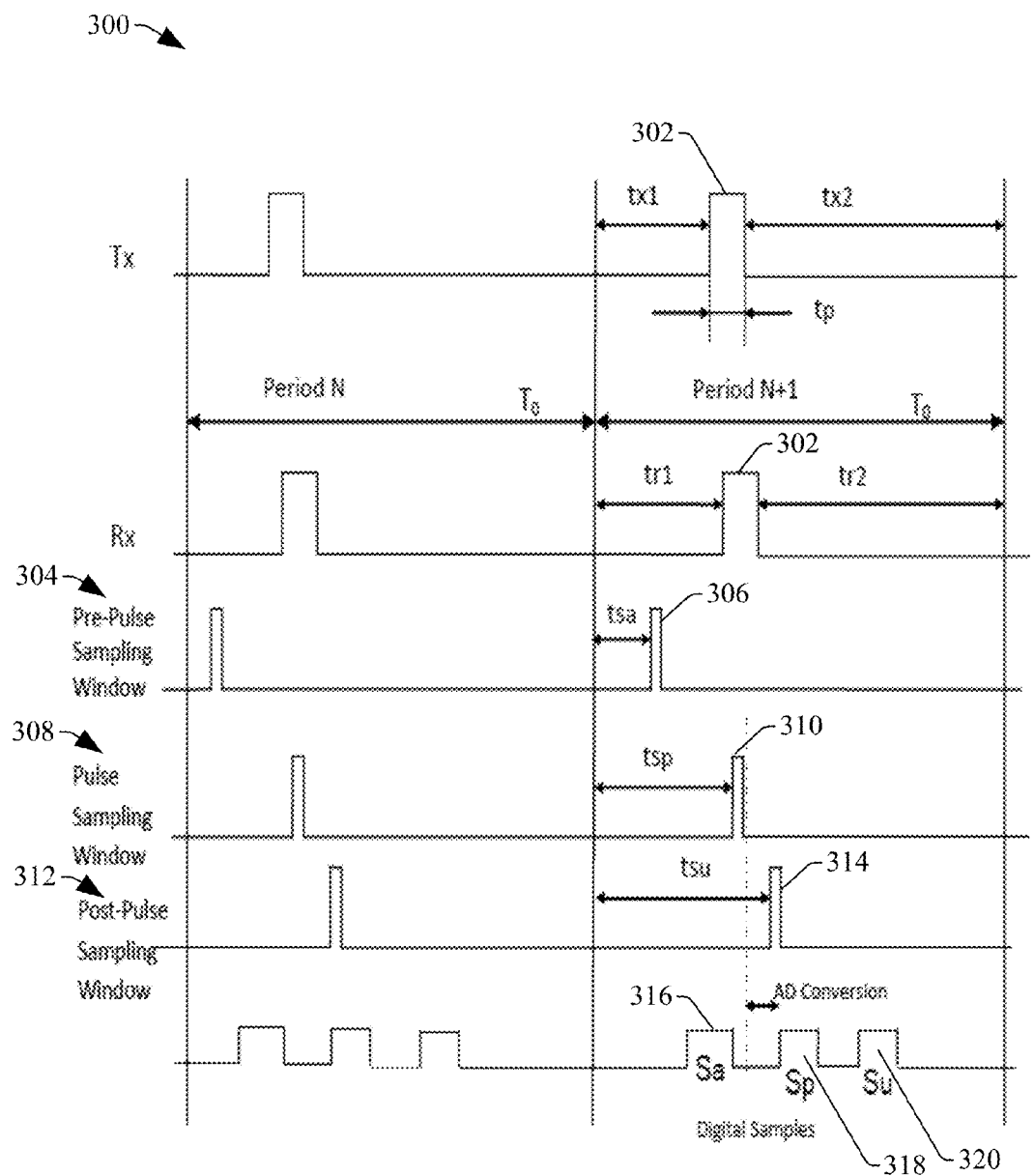
FIG. 3 illustrates a diagram of an example pulse timing diagram relating to a pulse signal associated with a sensor component, in connection with aspects and implementations of the disclosed subject matter.

Referring briefly to FIG. 3 (along with FIG. 1), FIG. 3 depicts an example pulse timing diagram 300 relating to a pulse signal associated with a sensor component, in connection with aspects and implementations of the disclosed subject matter. Depending on the type of sensor being employed by the sensor component 102, a detected pulse can indicate the presence of a target (e.g., an object) or the lack of presence of a target, and a detected pulse absence can indicate the lack of presence of a target or the presence of a target, respectively. For example, when the sensor component 102 comprises a diffuse sensor, a pulse detected by the receiver component 106 (e.g., as determined by the sensor management component 108) can indicate the presence of a target (e.g., an object interfering with or in the way of the light beam being transmitted from the transmitter component 104 to the receiver component 106), and detection of a pulse absence by the receiver component 106 (e.g., as determined by the sensor management component 108) can indicate the lack of presence of a target. As another example, when the sensor component 102 comprises a polarized photo reflective sensor, a pulse absence detected by the receiver component 106 (e.g., as determined by the sensor management component 108) can indicate the presence of a target, and detection of a pulse by the receiver component 106 (e.g., as determined by the sensor management component 108) can indicate the lack of presence of a target (e.g., absence of a target). It is to be appreciated and understood that while various aspects and implementations of the disclosed subject matter are described herein with regard to light sensors, the disclosed subject matter is not so limited. In accordance with various other aspects and implementations of the disclosed subject matter, the principles, components, methods, processes, functions, features, algorithms, techniques, etc., can be extended and/or modified to apply to sensors other than light sensors, and such principles, components, methods, processes, functions, features, algorithms, techniques, etc., as extended and/or modified, are considered part of the disclosed subject matter.

The transmitter component 104 can transmit pulses (e.g., light pulses), or the absence of pulses can be detected by the receiver component 106 (e.g., when an object is present to interfere with the reception of the pulse by the receiver component 106), during respective defined time periods (e.g., time windows), such as Period N and Period N+1, each having a defined length $T_0$ (e.g., an average pulse period), as depicted in the pulse timing diagram 300. During Period N+1, for instance, the transmitter component 104 can transmit a pulse 302 of length $t_p$ (e.g., pulse duration) at a time tx1 after the Period N+1 begins, wherein the pulse 302 can end with a time tx2 remaining between when the pulse 302 ends and when the Period N+1 ends. The time tx1 can be a fixed value or can have a value that varies from period to period in accordance with a defined sequence or a pseudo-random sequence, wherein the sequence can be different for different sensors (e.g., sensor component 102), and wherein respective (e.g., unique) sequences for respective sensors can enable the respective sensors to be differentiated and identifiable from each other (e.g., by the sensor management component 108 or another component) and can reduce or minimize the risk of interference or cross talk between different sensors that are in proximity to each other. The receiver component 106 can receive or detect the transmitted signal Rx, including receiving or detecting the pulse 302 (or an absence of pulse) at a time tr1, which can be a short time after the time tx1 that the transmitter component 104 transmitted the pulse 302, wherein there can be an amount of time tr2 remaining for Period N+1 after the end of receiving the pulse 302.

The sensor management component 108 can know at what time (e.g., at time tx1 into the Period N+1) the transmitter component 104 is going to be transmitting the pulse 302 to the receiver component 106 and/or at what time (e.g., at time tr1 into the Period N+1) the receiver component 106 is to receive the pulse 302 (or absence of pulse), and/or the length of time (e.g., $t_p$) of the pulse 302 (or absence of pulse). The sensor management component 108 and/or the receiver component 106 can sample (e.g., sample synchronously) the received signal Rx at a pre-pulse point at a time just prior to the time the pulse 302 is received or detected, during the time the pulse 302 (or absence of pulse) is being received or detected, and at a post-pulse point at a time shortly after the time the pulse 302 (or absence of pulse) is received or detected, by the receiver component 106.

The pulse timing diagram 300 illustrates a pre-pulse sampling signal 304 that includes a pre-pulse sampling window 306, a pulse sampling signal 308 that includes a pulse sampling window 310, and a post-pulse sampling signal 312 that includes a post-pulse sampling window 314. During the pre-pulse sampling window 306, the sensor management component 108 and/or the receiver component 106 can sample the received signal Rx at a pre-pulse point, such as at time tsa, after Period N+1 begins and before the pulse 302 (or absence of pulse) is received or detected by the receiver component 106 to generate an analog pre-pulse sample. During the pulse sampling window 310, the sensor management component 108 and/or the receiver component 106 can sample the received signal Rx at the pulse point, such as at time tsp, after Period N+1 begins, while the pulse 302 (or absence of pulse) is being received or detected by the receiver component 106, to generate an analog pulse sample. During the post-pulse sampling window 314, the sensor management component 108 and/or the receiver component 106 also can sample the received signal Rx at a post-pulse point, such as at time tsu, after Period N+1 begins and after the pulse 302 (or absence of pulse) has been received or detected by the receiver component 106, to generate an analog post-pulse sample. Sampling the signal Rx pre-pulse, during the pulse or absence thereof, and post-pulse can enable the sensor management component 108 to account for, separate, and/or remove lower frequency noise, such as modulated ambient light, from the pulse itself (e.g., as illustrated in FIG. 4 and described herein).

The sensor management component 108 and/or the receiver component 106 can convert the analog pre-pulse sample to a digital pre-pulse sample (Sa) 316, convert the analog pulse sample to a digital pulse sample (Sp) 318, and convert the analog post-pulse sample to a digital post-pulse sample (Su) 320. The respective time of generation of the digital pre-pulse sample (Sa) 316, digital pulse sample (Sp) 318, and digital post-pulse sample (Su) 320 can be a short amount of time after the respective generation of the analog pre-pulse sample, the analog pulse sample, and the analog post-pulse sample, due to the time involved in converting the respective analog samples to corresponding digital samples. The values (e.g., digital amplitude values) of the digital pre-pulse sample (Sa) 316, digital pulse sample (Sp) 318, and digital post-pulse sample (Su) 320 can respectively correspond to the values (e.g., analog amplitude values) of the analog pre-pulse sample, analog pulse sample, and analog post-pulse sample.

Figure 4:
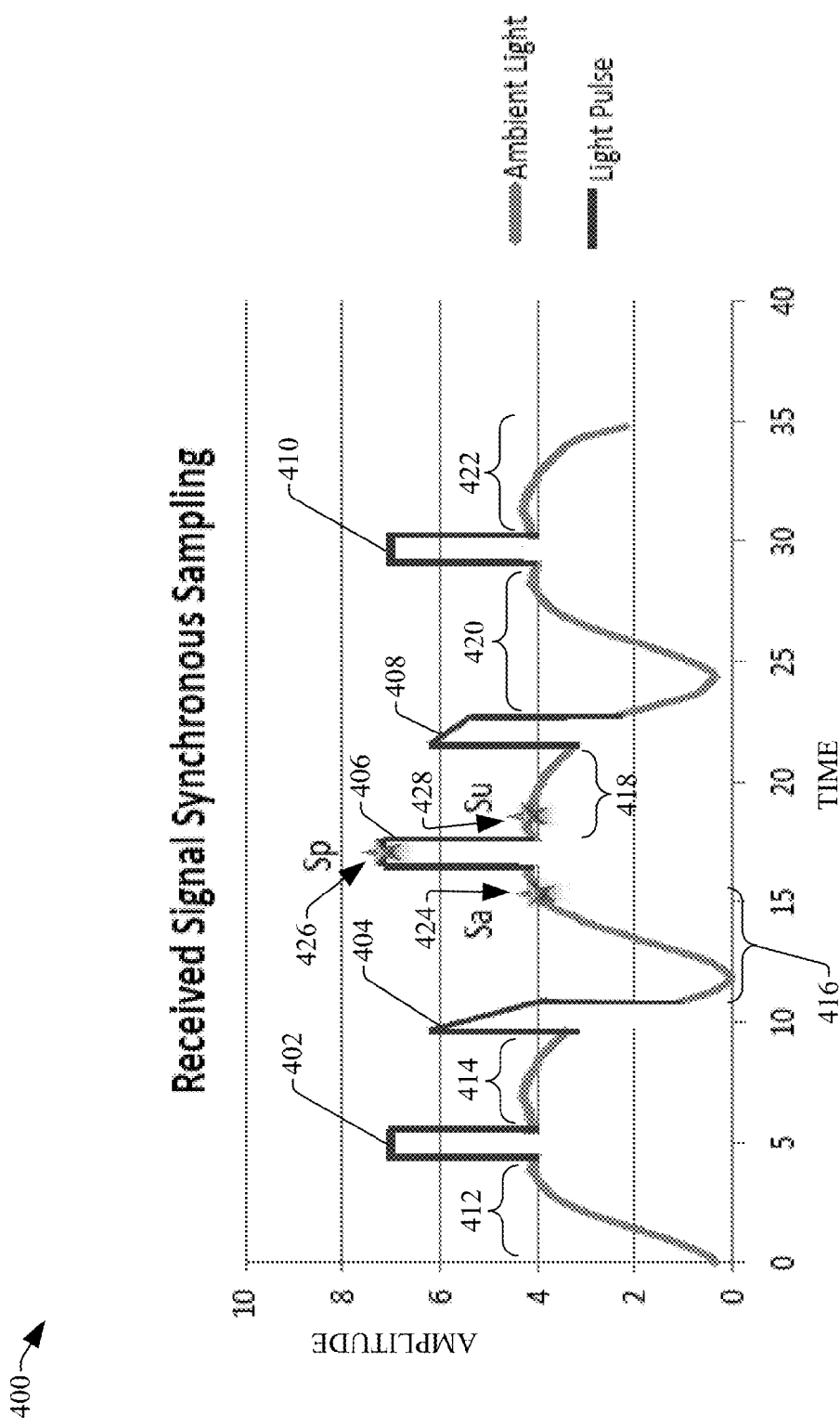
FIG. 4 illustrates a diagram of an example graph of a pulse signal that can include pulses (or absence of pulses) and modulated ambient light, in connection with aspects and implementations of the disclosed subject matter.

Referring briefly to FIG. 4 (along with FIG. 1 and FIG. 3), FIG. 4 illustrates a diagram of an example graph 400 of a pulse signal that can include pulses (or absence of pulses) and modulated ambient light, in connection with aspects and implementations of the disclosed subject matter. The graph 400 shows time along the x-axis and amplitude of the signal along the y-axis. The graph 400 illustrates a series of pulses (e.g., light pulses), comprising pulse 402, pulse 404, pulse 406, pulse 408, and pulse 410. The graph 400 also illustrates various levels of ambient light in regions of the graph 400 between the pulses, wherein the regions are, for example, region 412, region 414, region 416, region 418, region 420, and region 422.

As the pulse signal is being received by the receiver component 106, the sensor management component 108 or the receiver component 106 (e.g., as controlled by the sensor management component 108) can sample the pulse signal prior to a pulse 406 (e.g., in region 416) to generate a pre-pulse sample 424 (Sa), sample the pulse signal during the pulse 406 to generate a pulse sample 426 (Sp), and sample the pulse signal just after the pulse 406 (e.g., in region 418) to generate a post-pulse sample 428 (Su). The sensor management component 108 can determine (e.g., identify, calculate, measure) the pulse amplitude of the pulse 406 as a function of the pulse sample 426 and at least one of the pre-pulse sample 424 or the post-pulse sample 428 to facilitate accounting for, mitigating, and/or removing the ambient noise (e.g., ambient light noise or other noise) from the pulse signal in connection with the pulse 406. For example, the sensor management component 108 can determine the amplitude of the pulse 406 (Ap) as being equal to the amplitude of the pulse sample 426 (Sp) minus the average of the amplitude of the pre-pulse sample 424 (Sa) and the amplitude of the post-pulse sample 428 (Su) (e.g., $Ap=Sp-(Sa+Su)/2$).

In other implementations, the sensor management component 108 can determine the amplitude of the pulse 406 using another desired equation (e.g., a weighted equation), or as function of the pulse sample 426 and the pre-pulse sample 424 (e.g., $Ap=Sp-Sa$) (e.g., as desired or if the post-pulse sample 428 is not available), or as a function of the pulse sample 426 and the post-pulse sample 428 (e.g., $Ap=Sp-Su$) (e.g., as desired or if the pre-pulse sample 424 is not available). In still other implementations, the sensor management component 108 can increase the number of samples taken pre-pulse, during the pulse, and post-pulse (e.g., for each pulse, can take multiple pre-pulse samples, multiple pulse samples, and multiple post-pulse samples), and can determine the amplitude of the pulse 406 based at least in part on (e.g., as a function of) another equation that can take into account the increase in the number of samples taken pre-pulse, during the pulse, and post-pulse by extending the principles of the disclosed subject matter.

Figure 5:
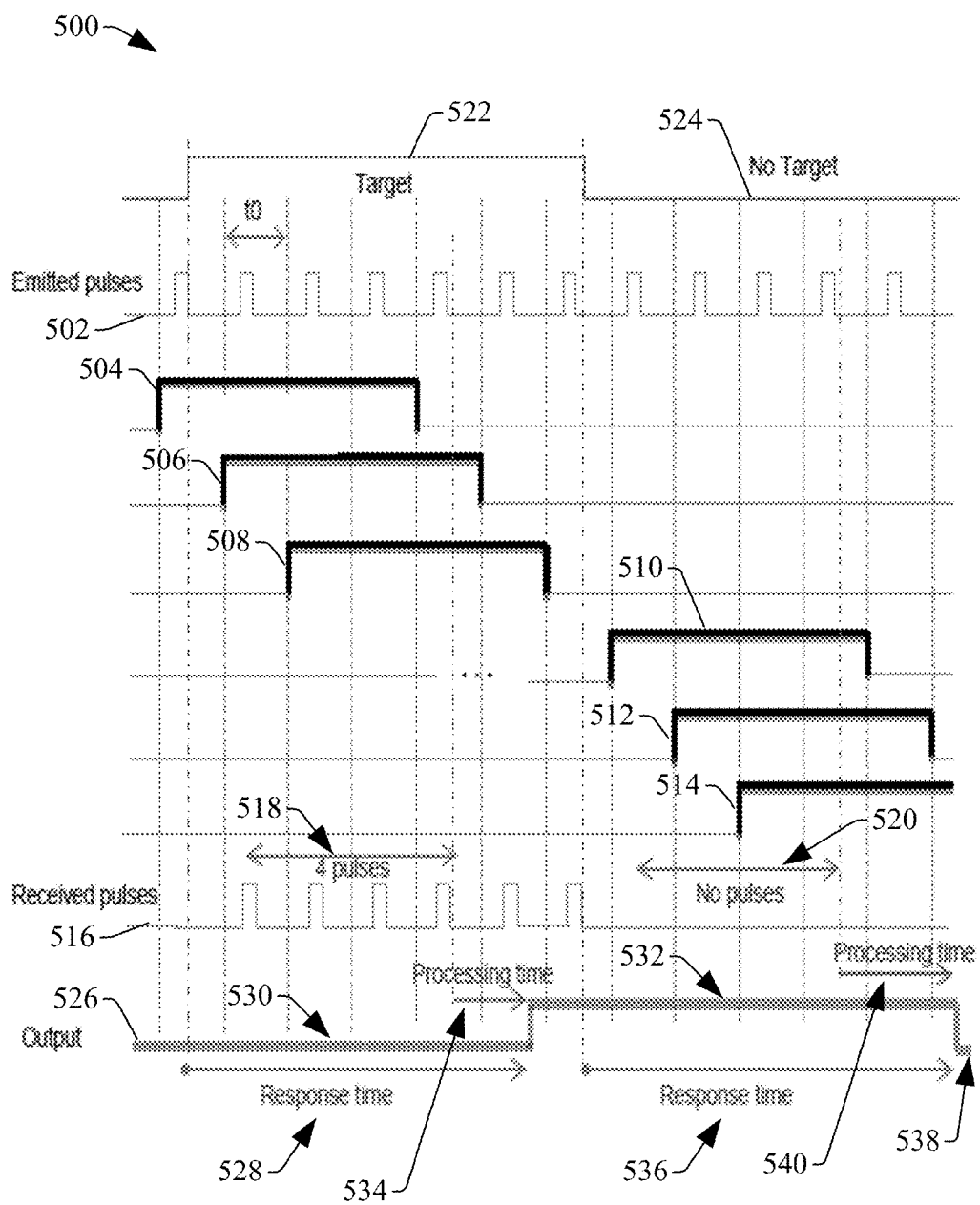
FIG. 5 presents a diagram of an example graph relating to detection of a target and response time based on pulse signals and sample windows, in connection with aspects and implementations of the disclosed subject matter.

Turning briefly to FIG. 5 (along with FIG. 1), FIG. 5 presents a diagram of an example graph 500 relating to detection of a target and response time based on pulse signals and sample windows, in connection with aspects and implementations of the disclosed subject matter. The sensor management component 108 can detect the presence of a target by the presence of pulses (e.g., when the sensor component 102 is a diffuse sensor) or by the absence of pulses (e.g., when the sensor component 102 is a polarized retro reflective sensor). The graph 500 relates to a sensor component 102 that is a diffuse sensor.

The graph 500 illustrates a sequence of emitted pulses 502 that can be emitted on a periodic basis which can be uniform or substantially uniform. The graph 500 also presents respective sample windows, including sample window 504, sample window 506, sample window 508, sample window 510, sample window 512, and sample window 514, wherein the sensor management component 108 can be sampling pulses during the respective sample windows to facilitate determining whether the target is present or not to facilitate determining the state (e.g., on state, off state) the sensor component 102 is to be in at a given time. During the sampling, the sensor management component 108 and/or receiver component 106 can identify that at least 4 pulses (e.g., 4 consecutive good light pulses) were received during the sampling of pulses in a first subset of sample windows (e.g., sample window 504, sample window 506, sample window 508), as depicted by the received pulse signal 516, comprising the subset of detected pulses 518. The sensor management component 108 can make this determination that at least 4 pulses were received based at least in part on the pre-pulse sampling, pulse sampling, and post-pulse sampling, for each pulse, as disclosed herein.

During the sampling, the sensor management component 108 and/or receiver component 106 also can identify that at least 4 absence of pulses (e.g., 4 consecutive good instances of an absence of a light pulse) were detected wherein an absence of light was detected in a second subset of sample windows (e.g., sample window 510, sample window 512, sample window 514) during the sampling of pulses, as depicted in the received pulse signal 516, comprising the subset of detected absences of pulses 520. The sensor management component 108 can make this determination that at least 4 instances of absence of pulse were detected (e.g., the detected pulses, or lack thereof, have an illumination that is below a defined threshold illumination level (e.g., a defined threshold pulse absence level) that indicates an absence of light or low state) based at least in part on the pre-pulse sampling, pulse sampling, and post-pulse sampling, for each pulse instance, as disclosed herein.

In connection with determining that at least 4 good light pulses were received or detected during the sampling of pulses in the first subset of sample windows, the sensor management component 108 can determine that the target exists (e.g., the target was detected) during that sampling period associated with the first subset of sample windows, as indicated at reference numeral 522. In connection with determining that at least 4 good absence of pulses were detected during the sampling of pulses in the second subset of sample windows, the sensor management component 108 can determine that no target exists (e.g., no target was detected) during that sampling period associated with the second subset of sample windows, as indicated at reference numeral 524.

The graph 500 also illustrates the response times and processing times in connection transitioning the sensor component 102 between states. For instance, as depicted in the output signal 526, there can be a first response time 528 by the sensor management component 108 for transitioning the sensor component 102 from the off state 530 to the on state 532 based at least in part on the time involved with sampling the received pulses to determine whether enough good light pulses are detected (e.g., in the first subset of detected pulses 518) to determine that the sensor component 102 is to be in the on state 532 and the associated processing time 534 involved in processing the detecting sampled pulse information. As also depicted in the output signal 526, there can be a second response time 536 by the sensor management component 108 for transitioning the sensor component 102 from the on state 532 to another off state 538 based at least in part on the time involved with sampling the received pulse signal to determine whether enough good absence of pulses are detected (e.g., in the second subset of absences of pulses 520) to determine that the sensor component 102 is to be in the off state 538 and the associated processing time 540 involved in processing the detected sampled pulse information.

To continue to illustrate with further regard to FIG. 1, as disclosed herein, the sensor management component 108 can track the levels of light pulses or absence of pulses, and the levels of respectively associated pre-pulses and post-pulses, in the sequence of pulses in the pulse signal to facilitate determining the amplitude of the respective pulses (or absence of pulses) after the removal of all or at least a portion of the ambient light noise or other noise in the pulse signal. The sensor management component 108 also can analyze the respective pulse instances to determine whether the respective pulses or absence of pulses can be defined as a good (e.g., meeting a defined sensor state criterion for acceptability of a pulse or pulse absence) or not. For example, the sensor management component 108 can analyze a pulse instance, and can compare the pulse amplitude to an applicable defined threshold pulse level to facilitate determining whether the pulse instance is a pulse or absence of pulse, and whether the pulse instance is a good light pulse or a good absence of pulse. If the pulse amplitude is above the defined threshold pulse level indicating a good light pulse, the sensor management component 108 can determine that the pulse is a good light pulse. If the pulse amplitude is below another defined threshold pulse level indicating a good absence of pulse, the sensor management component 108 can determine that the pulse is a good absence of pulse. If the pulse amplitude is not above the defined threshold pulse level relating to a good light pulse and not below the other defined threshold pulse level relating to a good absence of pulse, the sensor management component 108 can determine that the pulse instance is not a good pulse or pulse absence, and/or can determine that the pulse instance is an outlier pulse, as more fully described herein. In accordance with various implementations, the respective defined threshold pulse levels for a good pulse or a good pulse absence can be predefined and/or static (e.g., fixed) levels, or the respective defined threshold pulse levels can be determined or set based at least in part on (e.g., dependent in part on) the conditions or levels of other pulses or pulse absences in the sequence or sampling window.

The sensor management component 108 can analyze the amplitudes of the respective pulses and can compare the amplitude of each of the respective pulses to respective thresholds (e.g., a defined threshold pulse level indicating a good light pulse, a defined threshold pulse level indicating a good pulse absence, a defined threshold non-outlier range for a pulse, a defined threshold non-outlier range for a pulse absence), to facilitate determining an operational or a sensor state the sensor component 102 is to be in at a given time. In some implementations, the sensor management component 108 can track and count a number of pulses (e.g., a number of consecutive good light pulses in a row, or a number of consecutive good pulses having an absence of light) that are received by a receiver component 106 of the sensor component 102 to facilitate determining whether the sensor component 102 is to remain in a current state or is to be switched to a different state. For example, if the sensor component 102 is in an on state (e.g., active state), the sensor management component 108 can monitor and evaluate pulse instances to determine whether the sensor component 102 is to be switched to an off state. If the sensor component 102 is in an off state (e.g., inactive state), the sensor management component 108 can monitor and evaluate pulse instances to determine whether the sensor component 102 is to be switched to an on state and/or which on state (if there is more than one) to which the sensor component 102 is to be switched. For instance, the sensor management component 108 can determine that the sensor component 102 is to be in or transitioned to an on state (from an off state) if the sensor management component 108 determines that the number of good light pulses relating to (e.g., indicative of) an on state received (e.g., in a row) by the receiver component 106 satisfies (e.g., meets) a defined sensor state criterion (e.g., 4 good light pulses in a row are received by the receiver component 106, 5 good light pulses in a row are received by the receiver component 106, or another desired number of good light pulses in a row are received by the receiver component 106). The sensor management component 108 also can determine that the sensor component 102 is to be in or transitioned to an off state (from an on state) in response to the sensor management component 108 determining that the number of good absence-of-light pulses relating to (e.g., indicative of) an off state received (e.g., in a row) by the receiver component 106 satisfies another defined sensor state criterion (e.g., a sensor state criterion for switching the sensor component 102 to or maintaining the sensor component 102 in the off state).

In other implementations, the sensor management component 108 can evaluate a number of pulses during a given time period (e.g., during a time or sampling window), and can determine a ratio of good pulses (or good pulse absences) to the total number of pulses in the time period. If the sensor management component 108 determines that the ratio satisfies a defined threshold ratio for determining that there are enough good pulses in the time period to determine that the pulse exists, the sensor management component 108 can facilitate switching the sensor component 102 to, or maintaining the sensor component 102 in, the switch state that corresponds to a pulse being present. If the sensor management component 108 determines that the ratio satisfies a defined threshold ratio for determining that there are enough good pulse absences in the time period to determine that the pulse is absent, the sensor management component 108 can facilitate switching the sensor component 102 to, or maintaining the sensor component 102 in, the switch state that corresponds to a pulse being absent. In accordance with various implementations, the defined threshold ratio used in connection with good pulses can be the same as or different than the defined threshold ratio used in connection with good pulse absences.

In some implementations, the sensor management component 108 can employ linear filtering or non-linear filtering, or a combination thereof, to remove or mitigate spike, random, or other noise, such as light noise, to further facilitate making accurate state determinations for the sensor component 102 (e.g., to facilitate accurately determining whether the sensor component 102 is to be in the on state or off state). For instance, in addition to tracking and analyzing the levels of light pulses, and respective pre-pulses and post-pulses, in a sequence of pulses, the sensor management component 108 can employ non-linear filtering to identify any light pulse(s) (or absence of pulse(s)) that is an outlier pulse(s) (or an outlier absence of pulse(s)) from other pulse instances in a pulse sequence comprising a subset of pulses or absence of pulses. The sensor management component 108 can remove the outlier pulse(s) (or outlier absence of pulse(s)) from the subset or modify the amplitude of the outlier pulse(s) (or outlier absence of pulse(s)) to correspond or substantially correspond with the amplitudes of the good pulses or good absence of pulses in the subset of pulses or absence of pulses (e.g., modify the amplitude of an outlier pulse or outlier absence of pulse to have a value that is equal to the average amplitude value of the good pulses or good absence of pulses in the subset). This can facilitate accounting for high frequency noise (e.g., mitigating the effects of high frequency noise), such as spike or random light noise, in the pulse sequence by the sensor management component 108, which can enable the sensor management component 108 to further improve accurately determining light pulse levels, accurately determining the state the sensor component 102 is to be in at a given time associated with the subset of pulses or absence of pulses, and reducing or minimizing instances of false determinations regarding the state (e.g., on state, off state) that the sensor component 102 is supposed to be in at a given time. The sensor management component 108 also can make a determination regarding the state the sensor component 102 is to be in a given time based at least in part on the subset of pulses or absence of pulses that has been modified to remove or modify the outlier pulse(s) or outlier absence of pulse(s).

With further regard to the combined approach of using linear and non-linear filtering, for each pulse (i), the sensor management component 108 can calculate the pulse amplitude (Ap) from the pre-pulse sample (Sa), pulse sample (Sp), and post-pulse sample (Su), in accordance with the equation Ap=Sp−(Sa+Su)/2. The sensor management component 108 can define a window or sequence j of N pulses. It is to be appreciated and understood that the sequence of pulses can refer to a sequence of pulse instances that can comprise pulses and/or absence of pulses, or a sequence of pulse samples that can have values (e.g., amplitudes) that can represent a pulse or an absence of pulse. For instance, the sequence j can be a sequence of N pulse instances of pulses and/or absence of pulses, although there are instances herein where the sequence may be referred to as a sequence of pulses or sequence of pulse samples. In some implementations, the sensor management component 108 can define or calculate the signal level P(j) (e.g., pulse signal strength or amplitude) as $$P(j) = \sum_{n=0}^{n=N-1} A(j+n)$$

wherein A can be the amplitude of the (j+n)th pulse. It is to be appreciated and understood that the above example function for determining P(j) is but one example function that can be employed by the sensor management component 108 to estimate signal strength of the pulse signal. In other implementations, the sensor management component 108 can employ other functions or techniques for determining or estimating the signal strength of a pulse signal. For example, the sensor management component 108 can determine the average amplitude or signal strength of a sequence of N pulse instances by adding the amplitudes of the pulse sequence and dividing that total amplitude by N. In other example implementations, the sensor management component 108 can use a filter(s), such as an infinite impulse response (IIR) filter or a finite impulse response (FIR) filter, or other signal processing function(s) (e.g., using DSP functions, techniques, or algorithms) to facilitate determining or estimating the signal strength (e.g., signal level) P(j).

The sensor management component 108 can remove outlier pulse samples, which may be caused due to noise passing through the system 100, which can be a high bandwidth system. The sensor management component 108 can determine or define a non-outlier range (e.g., a defined threshold non-outlier range), a middle point of the non-outlier range, and a position of the non-outlier range, based at least in part on the distribution of the pulse samples (e.g., distribution of the amplitudes of the pulse samples) in the sequence j. The non-outlier range be a defined number R, and can comprise an upper range portion that can extend by a defined amount above the middle of the non-outlier range and a lower range portion that can extend by a defined amount below the middle of the non-outlier range. The sensor management component 108 can determine or define a pulse sample as not being an outlier if its pulse amplitude is within the non-outlier range, and can determine or define a pulse sample as being an outlier if its pulse amplitude is outside of the non-outlier range (e.g., if the pulse sample is away from the middle of the non-outlier range by more than half of the range R).

To facilitate determining an outlier pulse sample(s) in the sequence, and modifying the outlier pulse sample(s) or removing the outlier pulse sample(s) from the sequence, the sensor management component 108 can sort the pulse sample values of the pulse samples in the sequence j in a desired order. For instance, the sensor management component 108 can sort A(i) for i=j to j+N into an ascending order sequence B(k), k=0 to N−1. The sensor management component 108 can determine or identify sequence B(m) to B(n) such that n−m can be maximized for m=1 to N, for k=m to n, B(k)<B(m)+R. The sensor management component 108 can determine or position the range R so that the range R can have a maximum number of pulse samples as n−m+1.

The sensor management component 108 can determine or identify a pulse sample(s), if any, that is outside of range R, wherein such pulse sample(s) can be an outlier pulse sample(s), and can determine or identify pulse samples that are within the range R as being good or acceptable pulse samples. With regard to each pulse sample that has been determined to be an outlier pulse sample, the sensor management component 108 can remove the outlier pulse sample, or can replace or modify the pulse sample value of the outlier pulse sample (k<m or k>n) by the average value of the non-outlier pulse samples. The sensor management component 108 can determine (e.g., calculate) the adjusted signal strength Q(j) (e.g., adjusted pulse signal strength, level, or value) of the sequence j of pulse samples based at least in part on the values of the non-outlier pulse samples and the modified value(s) for each outlier pulse sample. For example, the sensor management component 108 can determine (e.g., calculate) the adjusted signal strength Q(j) of the sequence j of pulse samples as $$Q(j) = \sum_{k=0}^{k=N-1} B(k)$$

wherein B(k) can be sequence of pulse sample values for the sequence j.

It is to be appreciated and understood that the above example function for determining Q(j) is but one example function that can be employed by the sensor management component 108 to determine the adjusted signal strength of the pulse signal. In other implementations, the sensor management component 108 can employ other functions or techniques for determining or estimating the adjusted signal strength of a pulse signal. For example, the sensor management component 108 can determine the average adjusted signal strength of a sequence of N pulse instances by determining B(k) and dividing B(k) by N. In other example implementations, the sensor management component 108 can use a filter(s) (e.g., IIR filter or FIR filter) or other signal processing function(s) (e.g., using DSP functions, techniques, or algorithms) to facilitate determining or estimating the adjusted signal strength Q(j).

In some implementations, the sensor management component 108 can employ the following defined combined signal processing and pulse detection algorithm to facilitate detecting pulses or absences of pulse in a pulse signal and determining the state the sensor component 102 is to be in at a given time based at least in part on the detected pulses or absences of pulse.

Defined combined signal processing and pulse detection algorithm, or at least a portion thereof, can be as follows:

For each sample, count how many samples in the sequence are greater than the sample itself but within the acceptable range R.
C5=COUNTIF(A1:A12, ">="&A5)–COUNTIF(A1: A12, ">"&(A5+R))
Maximum number of samples within range Nx=MAX (C1:C12)
Index of the sample providing max number of samples in range=MATCH(MAX(C1:C12),C1:C12,0)
Value of lowest sample in range: Amin=INDEX(A1:A12, MATCH(MAX(C1:C12),C1:C12,0))
Zeroing samples out of range: B5=IF(OR(A5>(Amin+R), (A5<Amin)),0,A5)
Replacing Zeroed value with average of good samples D5=IF(B5, B5, SUM(B1:B12)/Nx)
Signal Strength=AVERAGE(D1:D12)

Figure 6:
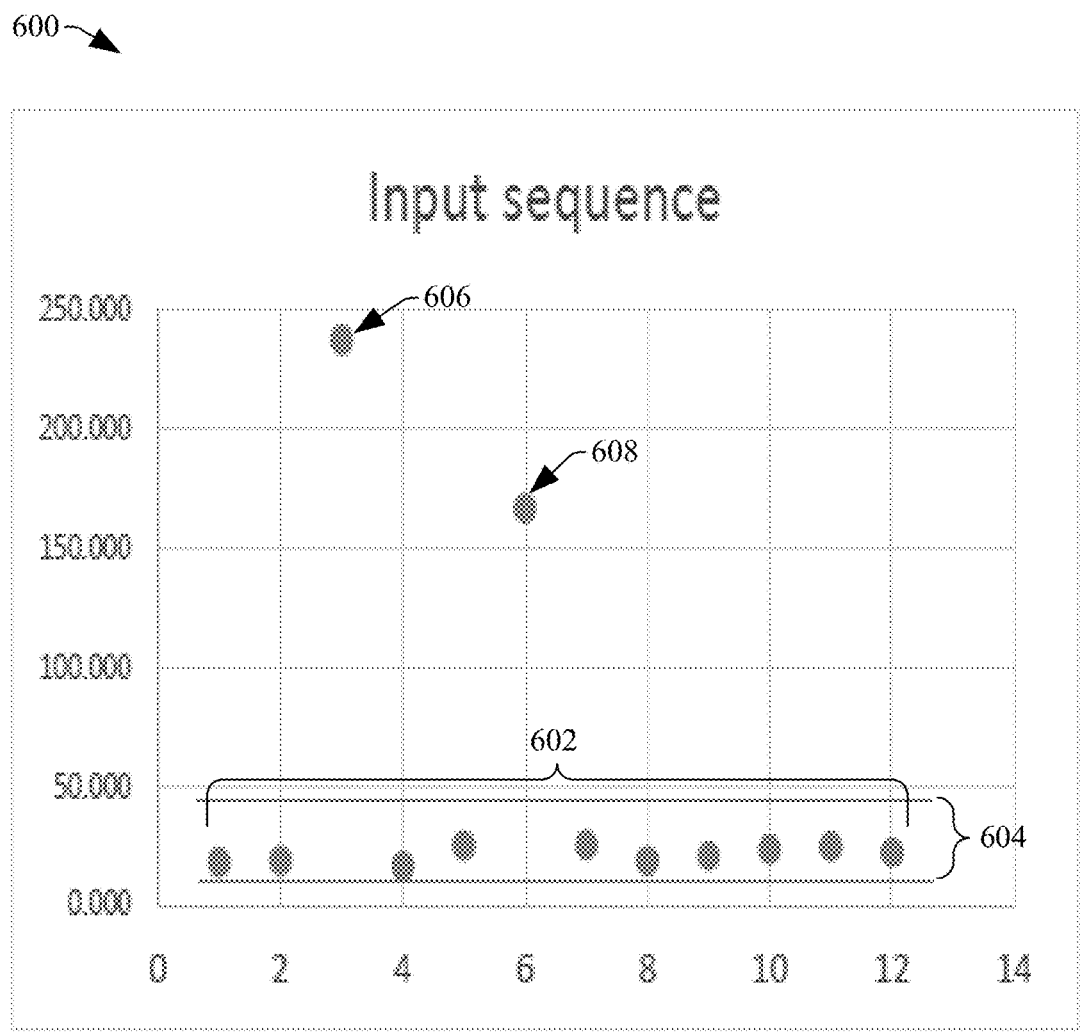
FIG. 6 presents a diagram of an example graph of an input sequence of pulse samples derived from a pulse signal received by the sensor component and processed by the sensor management component, in accordance with various aspects and implementations of the disclosed subject matter.
Figure 7:
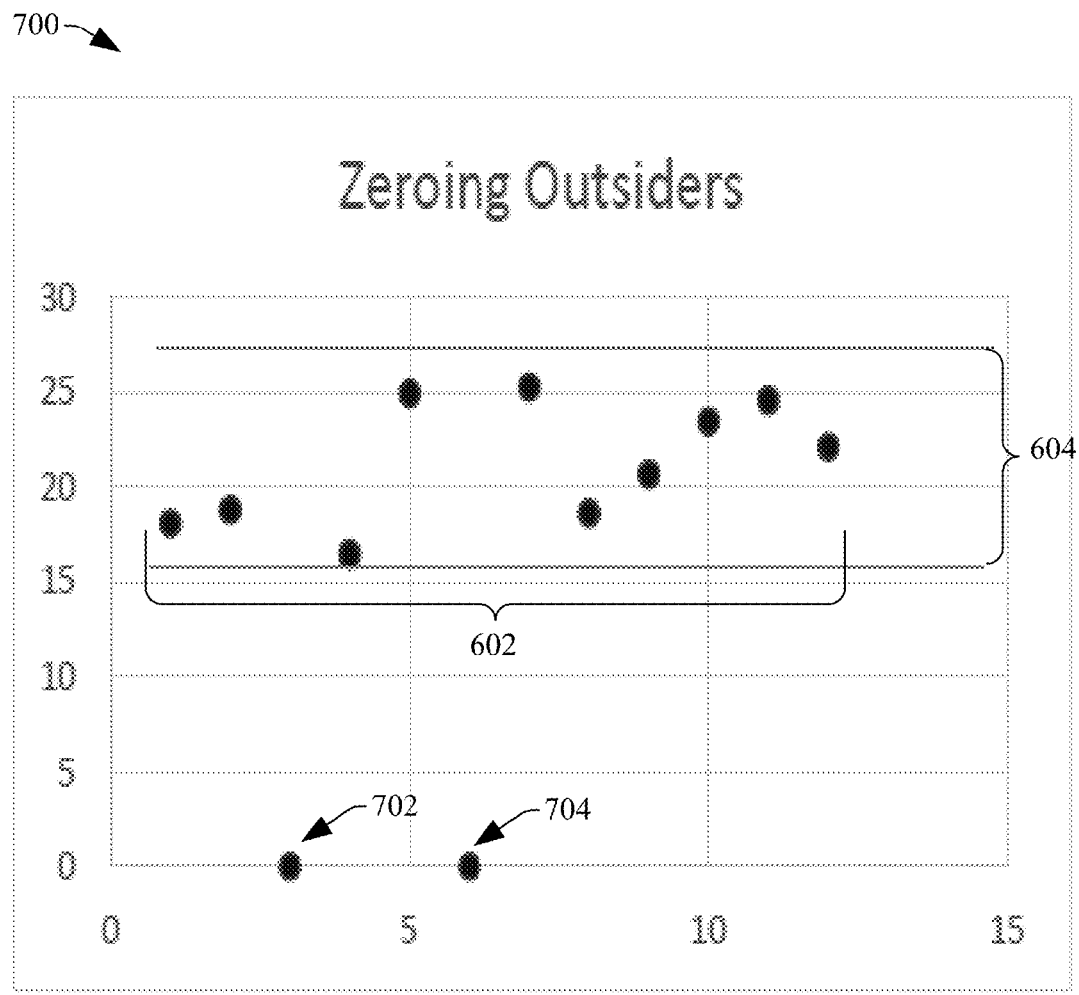
FIG. 7 presents a diagram of an example graph that can illustrate the pulse samples with outlier pulse samples that have been zeroed out (e.g., set to a value of 0), in accordance with various aspects and implementations of the disclosed subject matter.
Figure 8:
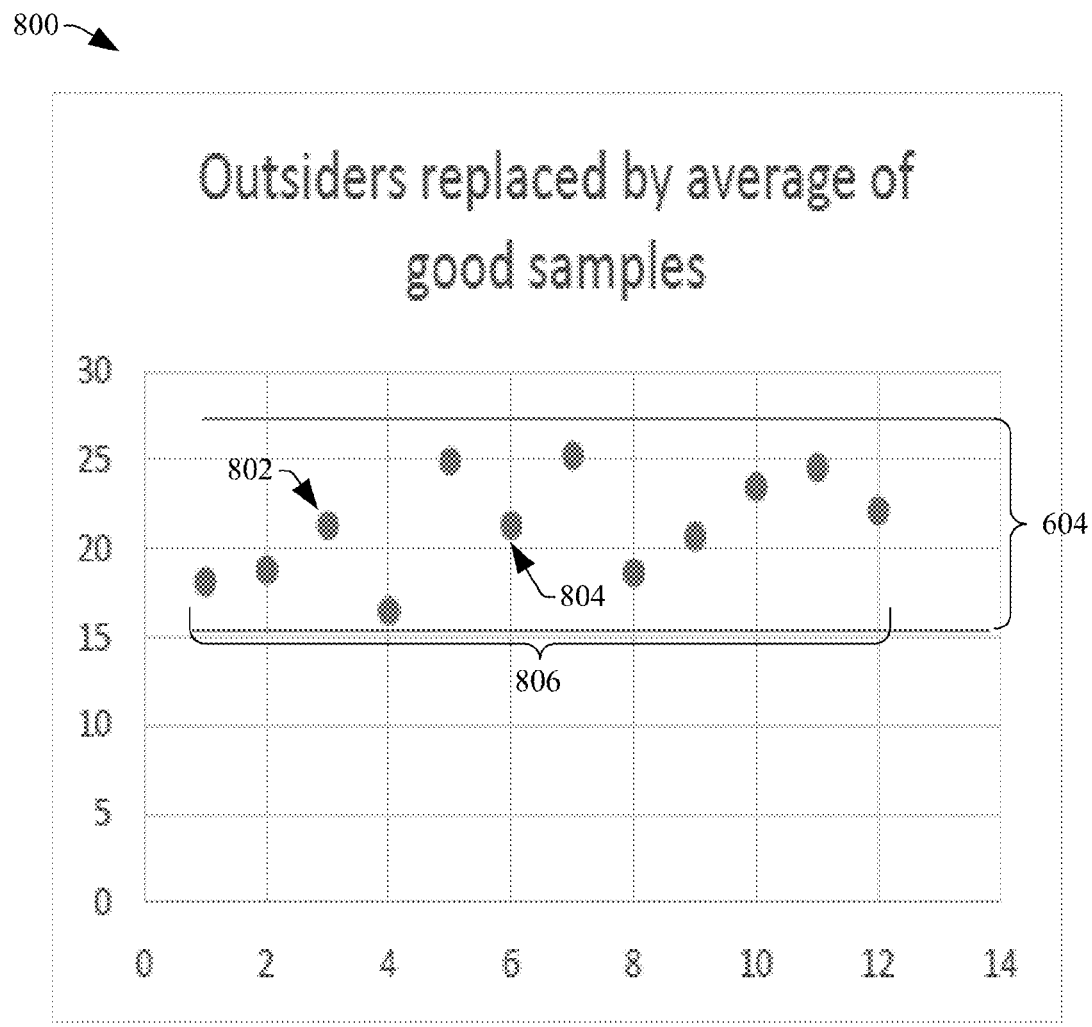
FIG. 8 presents a diagram of an example graph that can illustrate the pulse samples with the values of the outlier pulse samples modified or replaced with the average value of the good pulse samples, in accordance with various aspects and implementations of the disclosed subject matter.

Referring briefly to FIGS. 6, 7, and 8 (along with FIG. 1), FIG. 6 presents a diagram of an example graph 600 of an input sequence of pulse samples derived from a pulse signal received by the sensor component and processed by the sensor management component, in accordance with various aspects and implementations of the disclosed subject matter. FIG. 7 presents a diagram of an example graph 700 that can illustrate the pulse samples with outlier pulse samples that have been zeroed out (e.g., set to a value of 0), in accordance with various aspects and implementations of the disclosed subject matter. The graph 700 of FIG. 7 is different from graph 600 of FIG. 6 in that the graph 700 illustrates that the two outliers (e.g., 606 and 608 of the graph 600) have been removed and replaced by zero values, as more fully described herein. FIG. 8 presents a diagram of an example graph 800 that can illustrate the pulse samples with the values of the outlier pulse samples modified or replaced with the average value of the good pulse samples, in accordance with various aspects and implementations of the disclosed subject matter. The graph 800 of FIG. 8 is different from graph 600 of FIG. 6 and graph 700 of FIG. 7, in that the graph 800 illustrates that the two outliers (e.g., 606 and 608 of the graph 600) have been replaced by pulse samples that each have a value that is the same as the average of the values of the remaining pulse samples, as more fully described herein.

The respective values associated with the pulse samples shown in graph 600, graph 700, and graph 800 are presented in TABLE 1.

TABLE 1

| Input Samples | Zeroing Out of Range | Count Number | Replacing Zeroed Values |
|---|---|---|---|
| 18.091 | 18.09083 | 9.000 | 18.09083 |
| 18.799 | 18.79853 | 7.000 | 18.79853 |
| 237.062 | 0 | 1.000 | 21.29864 |
| 16.457 | 16.45671 | 10.000 | 16.45671 |
| 24.927 | 24.92678 | 2.000 | 24.92678 |
| 166.309 | 0 | 1.000 | 21.29864 |
| 25.265 | 25.2646 | 1.000 | 25.2646 |
| 18.618 | 18.61759 | 8.000 | 18.61759 |
| 20.676 | 20.67564 | 6.000 | 20.67564 |
| 23.463 | 23.46343 | 4.000 | 23.46343 |
| 24.571 | 24.57121 | 3.000 | 24.57121 |
| 22.121 | 22.12104 | 5.000 | 22.12104 |

The graph 600 illustrates the respective pulse sample values (e.g., ranging from 16.457 to 237.062) for the respectively numbered pulse samples (e.g., from 1 to 12) of the input sequence, with the respective pulse samples values of the graph 600 appearing in the first column (e.g., the Input Samples column) of TABLE 1. With respect to the graph 600, the sensor management component 108 can analyze the input pulse samples, can identify a subset of pulse samples 602 that are within a range 604 that can be determined by the sensor management component 108, in accordance with (e.g., using) the defined combined signal processing and pulse detection algorithm. The sensor management component 108 also can identify pulse sample 606 (e.g., $3^{rd}$ pulse sample) and pulse sample 608 (e.g., $6^{th}$ pulse sample) as being outlier pulse samples in response to determining that pulse sample 606 and pulse sample 608 are outside of the range 604.

The graph 700 illustrates the respective pulse sample values for the respectively numbered pulse samples (e.g., from 1 to 12) of the input sequence, with the outlier pulse samples having their values set to a value of 0, in accordance with the defined combined signal processing and pulse detection algorithm, wherein the respective pulse samples values of the graph 700 appear in the second column (e.g., the Zeroing Out of Range column) of TABLE 1. With respect to the graph 700, the sensor management component 108 can set the value of the $3^{rd}$ pulse sample 702 to 0 and can set the value of the $6^{th}$ pulse sample 704 to 0 in response to determining that the $3^{rd}$ pulse sample and the $6^{th}$ pulse sample are outlier pulse samples, in accordance with (e.g., using) the defined combined signal processing and pulse detection algorithm. As can be observed in the graph 700, the subset of pulse samples 602 (e.g., good pulse samples) that are within the range 604 can remain the same.

The graph 800 illustrates the respective pulse sample values for the respectively numbered pulse samples (e.g., from 1 to 12), with the outlier pulse samples having their values modified or replaced with the average value of the subset of pulse samples (e.g., good pulse samples), in accordance with the defined combined signal processing and pulse detection algorithm, wherein the respective pulse samples values of the graph 800 appear in the fourth column (e.g., the Replacing Zeroed Values column) of TABLE 1. With respect to the graph 800, the sensor management component 108 can modify or replace the value of the $3^{rd}$ pulse sample 802 and the value of the $6^{th}$ pulse sample 804 with the average value of the subset of pulse samples (e.g., good pulse samples), in accordance with (e.g., using) the defined combined signal processing and pulse detection algorithm. As can be observed in the graph 800, the subset of pulse samples 806 comprises the good pulse samples of the original subset of pulse samples (e.g., subset of pulse samples 602), the $3^{rd}$ pulse sample 802 (with its modified value), and the value of the $6^{th}$ pulse sample 804 (with its modified value), such that all of the pulse samples are now within the range 604.

With further regard to FIG. 1, with the adjusted signal strength Q(j) (e.g., adjusted pulse signal strength, level, or value) determined, the sensor management component 108 can use its knowledge of the adjusted signal strength Q(j), of the sequence j of N pulse samples, the number n−m+1 of good (e.g., acceptable) pulse samples in the sequence, and the respective positions of the good pulse samples within the sequence to facilitate determining whether to change the state of the sensor component 102 based at least in part on such information regarding the sequence j, in accordance with defined sensor state criteria and the defined combined signal processing and pulse detection algorithm. In some implementations, the sensor management component 108 can determine whether the number n−m+1 of good pulse samples in the sequence satisfies (e.g., exceeds) a defined threshold number (e.g., M) of good pulse samples (e.g., determine whether n−m+1>M). The value of M can be determined, selected, and/or implemented (e.g., by the sensor management component 108) based at least in part on the value of N. For instance, M can be determined, selected, and/or implemented (e.g., by the sensor management component 108) such that the value of M can be relatively close to the value of N to facilitate obtaining a desirable (e.g., optimal, maximized, or acceptable) robustness to noise. As an example, M can be set as M=2N/3, as at least an acceptable starting point, wherein M can be refined as desired (e.g., if necessary).

If the sensor management component 108 determines that there are not enough good pulse samples (e.g., acceptable pulse samples) in the sequence (e.g., if n−m+1 does not exceed the defined threshold number (e.g., M) of good of pulse samples), the sensor management component 108 can determine that the sensor component 102 is to remain in its current state. If the sensor management component 108 determines that there are enough valid pulse samples in the sequence, the sensor management component 108 can continue to evaluate the information relating to the sequence j to facilitate determining whether the sensor component 102 is to change state or not.

In accordance with the algorithm, the sensor management component 108 can determine the current state of the sensor component 102. If the sensor component 102 is determined to be in the off state, the sensor management component 108 can determine whether the adjusted signal strength Q(j) satisfies (e.g., exceeds) a defined threshold active level (e.g., A_threshold) for switching the sensor component 102 from the off state to the on state. If it is determined that the adjusted signal strength Q(j) satisfies the defined threshold active level, the sensor management component 108 can determine that the sensor component 102 is to be switched from the off state to the on state, and can facilitate switching the sensor component 102 to the on state. If it is determined that the adjusted signal strength Q(j) does not satisfy (e.g., is not greater than) the defined threshold active level, the sensor management component 108 can determine that the sensor component 102 is to remain in its current off state.

If, when determining the current state of the sensor component 102, the sensor management component 108 determines that the sensor component 102 is in the on state, the sensor management component 108 can determine whether the adjusted signal strength Q(j) satisfies (e.g., is below) a defined threshold inactive level (e.g., I_threshold) for switching the sensor component 102 from the on state to the off state. If it is determined that the adjusted signal strength Q(j) satisfies the defined threshold inactive level, the sensor management component 108 can determine that the sensor component 102 is to be switched from the on state to the off state, and can facilitate switching the sensor component 102 to the off state. If it is determined that the adjusted signal strength Q(j) does not satisfy (e.g., is not below) the defined threshold inactive level, the sensor management component 108 can determine that the sensor component 102 is to remain in its current on state. At this point, the sensor management component 108 can continue to analyze the received pulse signal, in accordance with the defined sensor state criteria and/or the defined combined signal processing and pulse detection algorithm, to facilitate controlling the operation and state of the sensor component 102.

Figure 9:
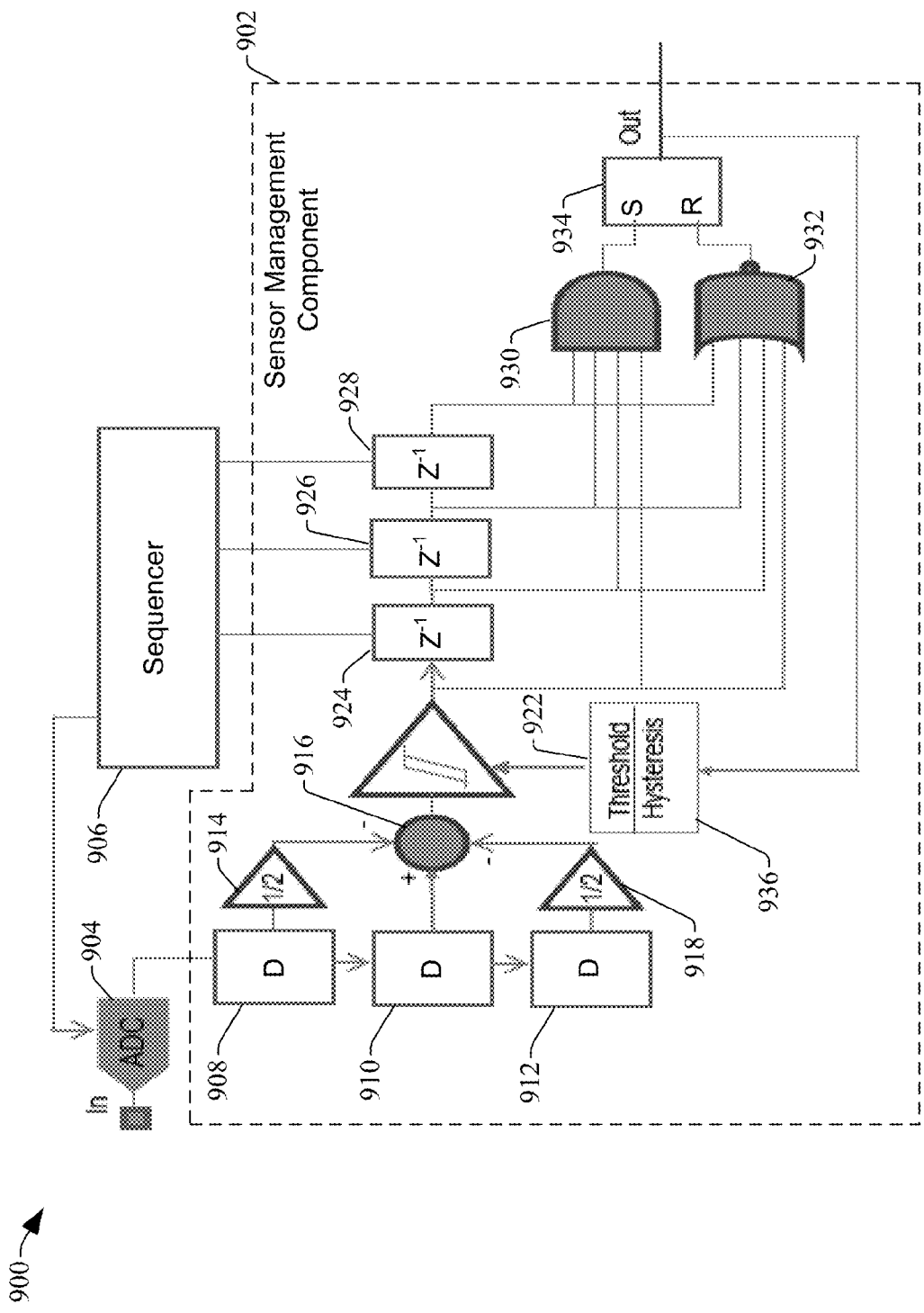
FIG. 9 depicts a diagram of an example system that can control the operation and state of a sensor component, in accordance with various aspects and embodiments of the disclosed subject matter.

FIG. 9 depicts a diagram of an example system 900 that can control the operation and state (e.g., switching state) of a sensor component (e.g., a photoelectric sensor), in accordance with various aspects and embodiments of the disclosed subject matter. The system 900 can comprise a sensor management component 902 that can be associated with (e.g., part of or communicatively connected to) a sensor component (not shown in FIG. 9), wherein the sensor management component 902 can facilitate detecting pulses or absences of pulse in a pulse sequence, in accordance with a defined pulse detection algorithm, to facilitate accurately determining a state (e.g., on state, off state) the sensor component is to be in at a given time.

The system 900 can comprise an ADC component 904 that can be associated with the sensor management component 902. When the receiver component of the sensor component receives the analog pulse signal (e.g., light pulses and absences of pulse) from the transmitter component of the sensor component, the ADC component 904 can convert the analog pulse signal to a digital pulse signal. The ADC component 904 and sensor management component 902 also can be associated with a sequencer component 906 that can provide a timing sequence to facilitate operation (e.g., synchronous operation) of the ADC component 904 and sensor management component 902. The sensor management component 902 can comprise a pre-pulse sampler component 908 that can sample the pulse signal prior to (e.g., at a defined amount of time before) an upcoming time in the pulse signal where a pulse or an absence of pulse is to occur, a pulse sampler component 910 that can sample the pulse signal during a time in the pulse signal where the pulse or absence of pulse is to occur, and a post-pulse sampler component 912 that can sample the pulse signal after (e.g., at a defined amount of time after) the time in the pulse signal where the pulse or absence of pulse is to occur. The sensor management component 902 can comprise function components 914, 916, and 918 that can process the respective outputs of the pre-pulse sampler component 908, pulse sampler component 910, and post-pulse sampler component 912, in accordance with the equation Ap=Sp−(Sa+Su)/2, wherein Ap can be the amplitude of the pulse or absence of pulse, Sp can be the amplitude of the pulse sample, Sa can be the amplitude of the pre-pulse sample, and Su can be the amplitude of the post-pulse sample. For example, the sensor management component 902 can determine the amplitude of the pulse (Ap) as being equal to the amplitude of the pulse sample (Sp) minus the average of the amplitude of the pre-pulse sample (Sa) and the amplitude of the post-pulse sample (Su). The pre-pulse sampling, pulse sampling, and post-pulse sampling in connection with each pulse instance (e.g., instance of a pulse or an absence of pulse during the time the pulse or absence of pulse is to occur), and calculating the amplitude of the pulse or absence of pulse to remove ambient light noise or other noise associated with the pulse instance, can facilitate reducing or eliminating low frequency modulated noise or other noise. This can facilitate enabling the sensor management component 902 to more accurately make state determinations regarding the sensor component than conventional systems, methods, or techniques.

The output signal (e.g., a series of calculated pulse amplitudes) of function component 916 can be provided to a comparator component 920 that can compare a pulse amplitude to a defined threshold pulse value or a defined threshold pulse absence value (e.g., obtained from the threshold component 922) to facilitate determining whether the pulse amplitude is to be defined as a pulse or an absence of pulse. For example, the comparator component 920 can compare the pulse amplitude to the defined threshold pulse value, and if the comparator component 920 determines that the pulse amplitude is above the defined threshold pulse value, the comparator component 920 can determine that the pulse amplitude indicates a pulse occurred. The comparator component 920 also or alternatively can compare the pulse amplitude to the defined threshold pulse absence value, and if the comparator component 920 determines that the pulse amplitude is below the defined threshold pulse absence value, the comparator component 920 can determine that the pulse amplitude indicates an absence of pulse occurred or is detected.

The sensor management component 902 also can comprise a set of delay components, such as delay component 924, delay component 926, and delay component 928, that can be employed to facilitate holding or storing (e.g., temporarily) the determinations of pulses or absences of pulse to facilitate determining whether enough good pulses, or enough good absences of pulses, have been received to facilitate determining the state the sensor component is to be placed in, in response to the pulse signal, or portion thereof. The number of delay components employed can be based at least in part on the number of good pulses (e.g., the number of consecutive good pulses), or the number of good pulse absences (e.g., the number of consecutive good pulse absences), that are desired for the sensor management component 902 to be able to determine that a state determination can be made and/or to determine the state the sensor component is to be placed in (e.g., switched to or maintained in), in response to the pulse signal (e.g., the subset of pulse instances comprising pulses or pulse absences). For example, if it is desired to have four good pulses in a row, or four good pulse absences in a row, in order for the sensor management component 902 to be able to determine that a state determination can be made and/or to determine the state the sensor component is to be placed in, in response to the subset of pulse instances, three delay components (e.g., 924, 926, 928) can be employed by the sensor management component 902. If it is desired to have five good pulses in a row, or five good pulse absences in a row, in order for the sensor management component 902 to be able to determine that a state determination can be made and/or to determine the state the sensor component is to be placed in, in response to the subset of pulse instances, four delay components can be employed by the sensor management component 902.

The sensor management component 902 also can comprise a subset of function components, comprising function component 930 (e.g., AND gate), function component 932 (e.g., NOR gate), and function component 934 (e.g., a switch component), that can receive the output of pulse instances from the set of delay components (e.g., 924, 926, 928). The subset of function components (e.g., 930, 932, 934) can operate in relation to each other to facilitate determining whether there are enough (e.g., a defined number of) good pulses, or enough (e.g., a defined number of) good pulse absences, to make a state determination for the sensor component. In response to the respective outputs of the function component 930 and function component 932, wherein those respective outputs can be input to function component 934, the output of the function components 934 (e.g., switch component) can be switched to one state (e.g., a high or on state or value) or another state (e.g., a low or off state or value). A high state at the output of function component 934 can indicate that the sensor component is to be in the on state, and a low state at the output of function component 934 can indicate that the sensor component is to be in the off state, and the sensor management component 902 can facilitate controlling the switching state of the sensor component, in accordance with the output of the function component 934.

The sensor component can be associated with a hysteresis. The threshold component 922 can be related to a defined hysteresis 936 for the sensor component, wherein the defined hysteresis 936 can be determined or defined based at least in part on the difference between the defined threshold pulse value and the defined threshold pulse absence value and/or the output signal from the function component 934. The relation between the sensing distance hysteresis and signal level hysteresis for the sensor component can be product specific (e.g., specific to the design, fabrication, type, or other feature of a sensor component).

Figure 10:
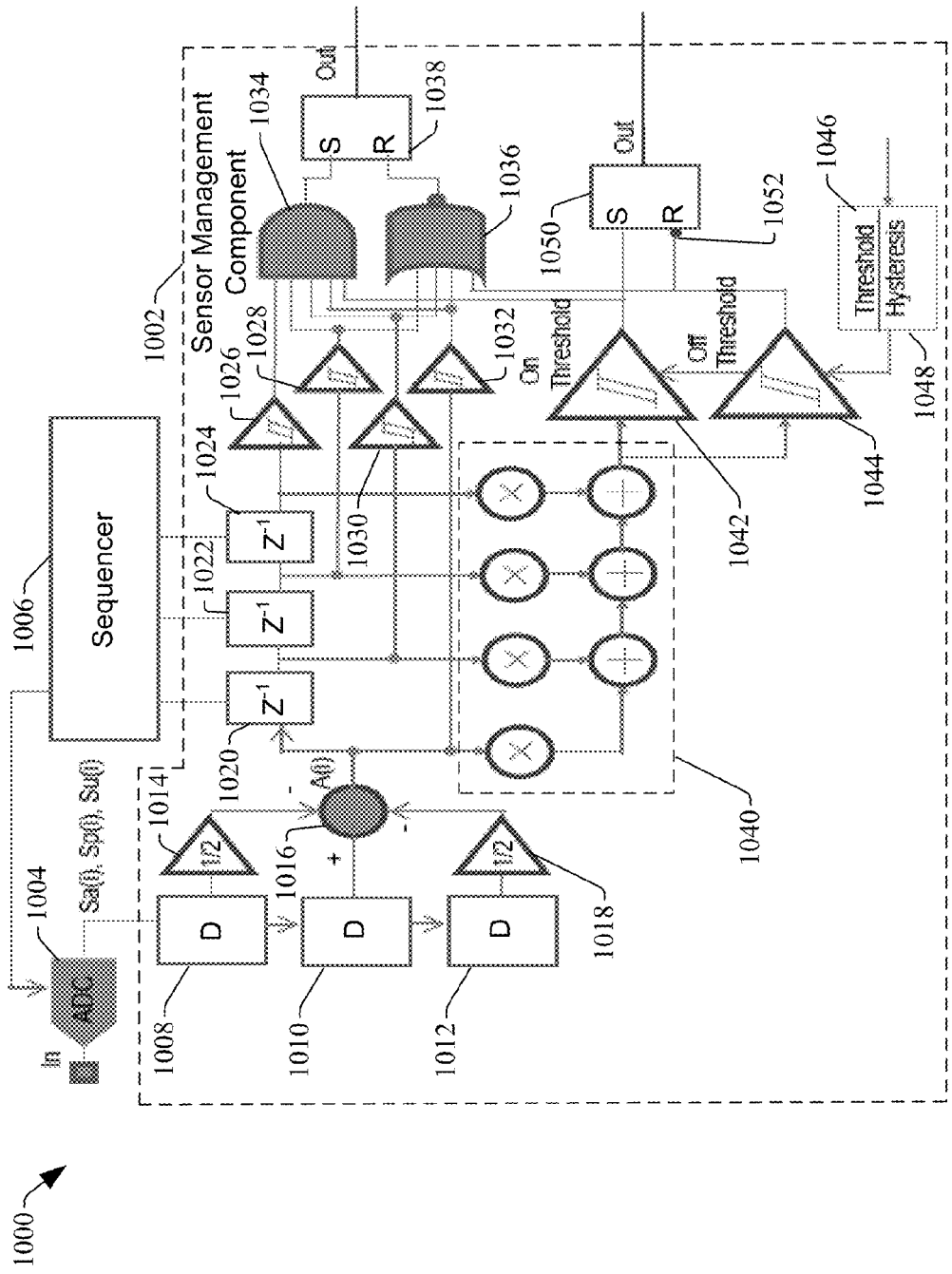
FIG. 10 illustrates a diagram of an example system that can employ combined signal processing and detection techniques to facilitate controlling the operation and state of a sensor component, in accordance with various aspects and embodiments of the disclosed subject matter.

FIG. 10 illustrates a diagram of an example system 1000 that can employ combined signal processing and detection techniques to facilitate controlling the operation and state (e.g., switching state) of a sensor component (e.g., a photoelectric sensor), in accordance with various aspects and embodiments of the disclosed subject matter. The system 1000 can comprise a sensor management component 1002, an ADC component 1004, a sequencer component 1006, pre-pulse sampler component 1008, pulse sampler component 1010, post-pulse sampler component 1012, function component 1014, function component 1016, function component 1018, delay component 1020, delay component 1022, delay component 1024. These components can respectively operate in a manner similar to respective or corresponding components as described with regard to the system 900 of FIG. 9.

The sensor management component 1002 also can comprise a set of function components (e.g., filter components, comparator components, or other components), comprising function component 1026, function component 1028, function component 1030, and function component 1032, that can facilitate identifying or detecting outlier pulses or outlier pulse absences in a pulse sequence, processing outlier pulses or outlier pulse absences to modify or replace outlier pulse sample values with average pulse sample value of the good pulses or good pulse absences in the pulse sequence, and/or determining whether there are enough good pulse samples (of pulses or pulse absences) in the pulse sequence to consider determining whether to change the state of the sensor component in response to the adjusted pulse signal strength of the pulse sequence. The sensor management component 1002 can further comprise function component 1034 (e.g., AND gate), function component 1036 (e.g., NOR gate), and function component 1038 (e.g., switch component), wherein the function components 1034, 1036, and 1038 can respectively operate in a manner similar to respective or corresponding components (e.g., 930, 932, 934) as described with regard to the system 900 of FIG. 9. The output from the function component 1038 can be, for example, an output signal that can indicate the adjusted pulse signal strength of the pulse sequence and/or can indicate whether there are enough good pulse samples (of pulses or pulse absences) in the pulse sequence to consider determining whether to change the state of the sensor component in response to the adjusted pulse signal strength of the pulse sequence.

The sensor management component 1002 also can comprise a signal processing component 1040 that can comprise a number of sub-components (e.g., summing or combining sub-components) that can facilitate processing (e.g., summing or combining) the respective pulse sample values associated with pulses or pulse absences in the sequence, for example, as respectively delayed by the delay components (e.g., 1020, 1022, 1024), to facilitate obtaining or generating the pulse signal level for the pulse sequence. The sensor management component 1002 further can include a comparator component 1042, comparator component 1044, and threshold component 1046 that can be employed to facilitate determining a state the sensor component is to be in, in response to the pulse sequence. The comparator component 1042 can be associated with the threshold component 1046 and can receive, from the threshold component 1046, threshold information relating to a defined threshold active level for placing (e.g., switching) the sensor component in the on state. The comparator component 1044 also can be associated with the threshold component 1046 and can receive, from the threshold component 1046, threshold information relating to a defined threshold inactive level for placing (e.g., switching) the sensor component in the off state.

The threshold component 1046 also can be related to a defined hysteresis 1048 for the sensor component, wherein the defined hysteresis 1048 can be determined or defined based at least in part on the difference between the defined threshold active level and the defined threshold inactive level (e.g., Hysteresis=A_threshold−I_threshold) and/or the output signal from the sensor management component or sensor component. The relation between the sensing distance hysteresis and signal level hysteresis for a sensor component can be product specific (e.g., specific to the design, fabrication, type, or other feature of a sensor component).

The comparator component 1042 and comparator component 1044 can receive the pulse signal level for the pulse sequence from the output of the signal processing component 1040. In response to receiving the pulse signal level for the pulse sequence, the comparator component 1042 can compare the pulse signal level to the defined threshold active level. If the pulse signal level is higher than the defined threshold active level, the comparator component 1042 can provide an output signal (e.g., a high signal) that can indicate that the pulse signal level exceeded the defined threshold active level for placing the sensor component in the on state. If the pulse signal level is not higher than the defined threshold active level, the comparator component 1042 can provide an output signal (e.g., a low signal) that can indicate that the pulse signal level does not exceed the defined threshold active level for placing the sensor component in the on state. The output signal of the comparator component 1042 can be provided to function component 1034 and to the function component 1050 (e.g., switch component) to facilitate determining the state in which the sensor component is to be placed.

With regard to comparator component 1044, in response to receiving the pulse signal level for the pulse sequence, the comparator component 1044 can compare the pulse signal level to the defined threshold inactive level. If the pulse signal level is lower than the defined threshold inactive level, the comparator component 1044 can provide an output signal (e.g., a high signal) that can indicate that the pulse signal level is below the defined threshold inactive level for placing the sensor component in the off state. If the pulse signal level is not lower than the defined threshold inactive level, the comparator component 1044 can provide an output signal (e.g., a low signal) that can indicate that the pulse signal level is not below the defined threshold inactive level for placing the sensor component in the off state. The output signal of the comparator component 1044 can be provided to function component 1036 and to an inverter component 1052 associated with the function component 1050 to facilitate determining the state in which the sensor component is to be placed, wherein the inverter component 1052 can change the output signal (e.g., high signal) to an inverted signal (e.g., a low signal). The output signal from the function component 1050 can indicate whether the sensor component is to be in the on state or off state, wherein the sensor management component 1002 can determine the state the sensor component is to be in, and/or whether to change the state of the sensor component, based at least in part on the output signal from the function component 1050 and the output signal from the function component 1038. The output signal from function component 1038 and the output signal from the function component 1050 can be analyzed and/or combined by the sensor management component 1002 to facilitate determining the state in which the sensor component is to be placed, in accordance with the defined combined signal processing and pulse detection algorithm, as more fully described herein.

Figure 11:
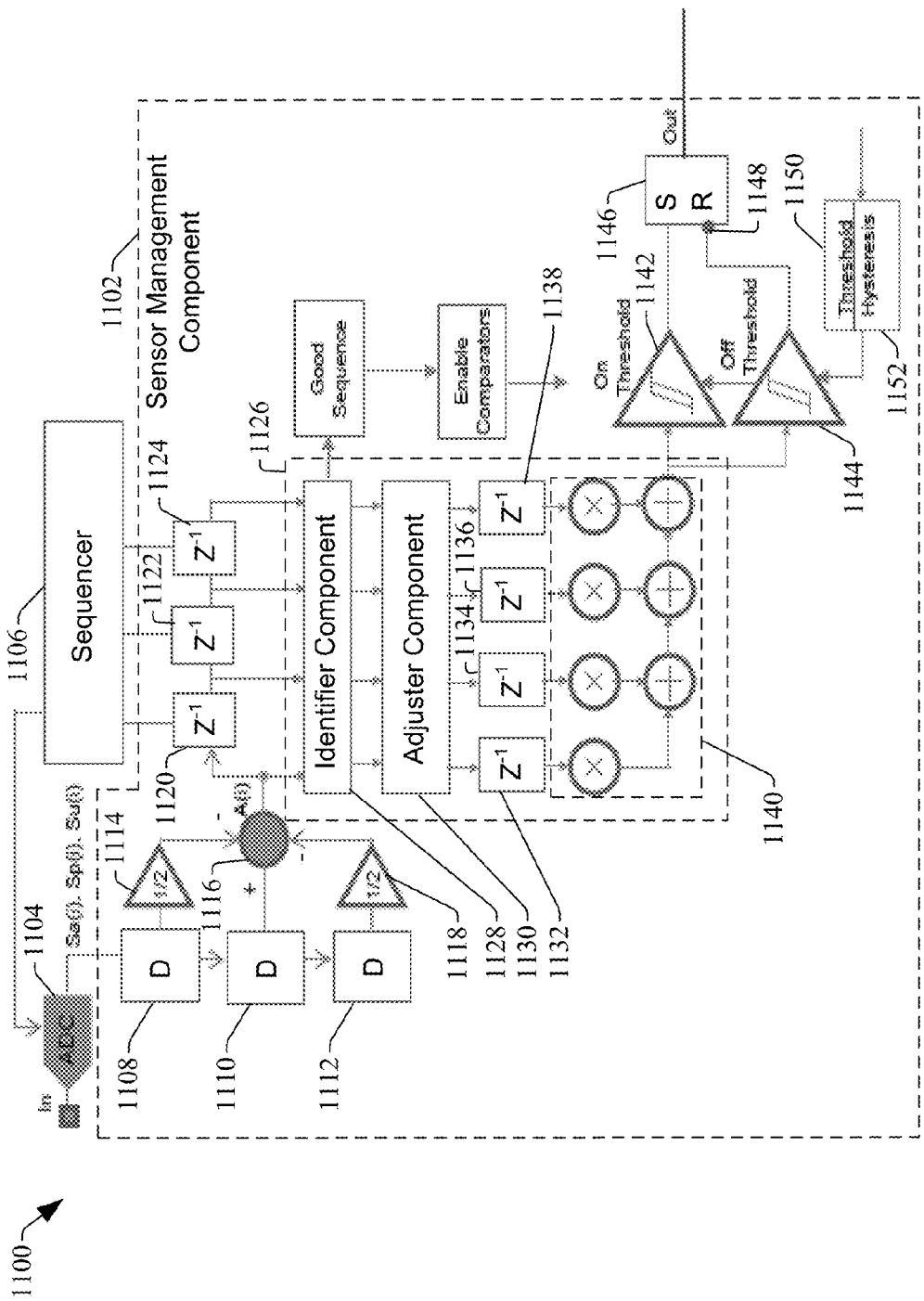
FIG. 11 illustrates a diagram of an example system that can employ combined signal processing and detection techniques, including outlier processing and linear filtering, to facilitate controlling the operation and state of a sensor component, in accordance with various aspects and embodiments of the disclosed subject matter.

FIG. 11 illustrates a diagram of an example system 1100 that can employ combined signal processing and detection techniques, including outlier processing and linear filtering, to facilitate controlling the operation and state (e.g., switching state) of a sensor component, in accordance with various aspects and embodiments of the disclosed subject matter. The system 1100 can comprise a sensor management component 1102, an ADC component 1104, a sequencer component 1106, pre-pulse sampler component 1108, pulse sampler component 1110, post-pulse sampler component 1112, function component 1114, function component 1116, function component 1118, delay component 1120, delay component 1122, delay component 1124. These components can respectively operate in a manner similar to respective or corresponding components as described with regard to the system 900 of FIG. 9 and system 1000 of FIG. 10.

The sensor management component 1102 also can comprise a signal processing component 1126 that can comprise a number of sub-components and perform a variety of functions. The signal processing component 1126 can be associated with (e.g., connected to) the function component 1116, the delay components 1120, 1122, and 1124, and/or other components of the sensor management component 1102. In some implementations, the signal processing component 1126 can comprise an identifier component 1128 that can analyze a sequence of pulses and can identify or determine whether the sequence is a good sequence of pulses (e.g., comprises a desired number of good pulses in a row, or comprises a sufficient number of good pulses such that the ratio of good pulses to the total number of pulses in the sequence is acceptable), in accordance with defined sensor state criteria. The signal processing component 1126 also can identify any outlier pulse(s) in the sequence, wherein an outlier pulse can be identified or determined as more fully described herein.

The signal processing component 1126 can comprise an adjuster component 1130 that can adjust or substitute a value (e.g., amplitude or level) of any outlier pulse in the sequence to account for any noise or interference that may have caused such pulse to have an outlier value. For example, the adjuster component 1130 can adjust or replace the value of an outlier pulse to or with an average value or an extrapolated estimated value that can be based at least in part on (e.g., determined as a function of) the values of the pulses that were determined to be good pulses in the sequence.

The signal processing component 1126 can include a desired number of delay components, comprising delay components 1132, 1134, 1136, and 1138, that can be employed to facilitate holding or storing (e.g., temporarily) information relating to pulse values or pulse absence values (including an adjusted or a replacement value(s) for an outlier pulse(s)), determinations of pulses or pulse absences, or other information to facilitate determining an adjusted pulse signal strength for the pulse sequence to facilitate determining the state the sensor component is to be placed in, in response to the pulse signal, or portion thereof. The signal processing component 1126 also can comprise a subset of sub-components 1140 (e.g., summing or combining sub-components) that can facilitate processing (e.g., summing or combining) the respective pulse sample values (e.g., good pulse sample values, adjusted pulse sample values for outlier pulses) associated with pulses or pulse absences in the sequence, for example, as respectively delayed by the delay components (e.g., 1132, 1134, 1136, and 1138), to facilitate determining, obtaining, or generating the adjusted pulse signal level for the pulse sequence, as more fully described herein.

When the signal processing component 1126 determines that a pulse sequence is a good pulse sequence, the signal processing component 1126 can enable comparator component 1142 and/or comparator component 1144 to facilitate comparing the adjusted pulse signal level for the pulse sequence that is output from the subset of sub-components 1140 to the defined threshold active level associated with comparator component 1142 and/or the defined threshold inactive level associated with comparator component 1144. For instance, in response to receiving the adjusted pulse signal level for the pulse sequence, the comparator component 1142 can compare the pulse signal level to the defined threshold active level. If the adjusted pulse signal level is higher than the defined threshold active level, the comparator component 1142 can provide an output signal (e.g., a high signal) that can indicate that the adjusted pulse signal level exceeded the defined threshold active level for placing the sensor component in the on state. If the adjusted pulse signal level is not higher than the defined threshold active level, the comparator component 1142 can provide an output signal (e.g., a low signal) that can indicate that the adjusted pulse signal level does not exceed the defined threshold active level for placing the sensor component in the on state. The output signal of the comparator component 1142 can be provided to function component 1146 (e.g., switch component) to facilitate determining the state in which the sensor component is to be placed.

With regard to comparator component 1144, in response to receiving the adjusted pulse signal level for the pulse sequence, the comparator component 1144 can compare the adjusted pulse signal level to the defined threshold inactive level. If the adjusted pulse signal level is lower than the defined threshold inactive level, the comparator component 1144 can provide an output signal (e.g., a high signal) that can indicate that the adjusted pulse signal level is below the defined threshold inactive level for placing the sensor component in the off state. If the adjusted pulse signal level is not lower than the defined threshold inactive level, the comparator component 1144 can provide an output signal (e.g., a low signal) that can indicate that the adjusted pulse signal level is not below the defined threshold inactive level for placing the sensor component in the off state. The output signal of the comparator component 1144 can be provided to an inverter component 1148 associated with the function component 1146 (e.g., switch component), wherein the inverter component 1148 can change the output signal (e.g., high signal) from the comparator component 1144 to an inverted signal (e.g., a low signal) that can be input to the function component 1146. The signal input to the function component 1146 can be used (e.g., analyzed) by the function component 1146 to facilitate determining the state in which the sensor component is to be placed. The output signal from the function component 1146 can indicate whether the sensor component is to be in the on state or off state, wherein the sensor management component 1102 can determine the state the sensor component is to be in, and/or whether to change the state of the sensor component, based at least in part on the output signal from the function component 1146.

The comparator component 1142 and comparator component 1144 also can be associated with a threshold component 1150, wherein the comparator component 1142 can receive, from the threshold component 1150, threshold information relating to the defined threshold active level for placing (e.g., switching) the sensor component in the on state, and the comparator component 1144 can receive, from the threshold component 1150, threshold information relating to the defined threshold inactive level for placing (e.g., switching) the sensor component in the off state. The threshold component 1150 also can be related to a defined hysteresis 1152 for the sensor component, wherein the defined hysteresis 1152 can be determined or defined based at least in part on the difference between the defined threshold active level and the defined threshold inactive level (e.g., Hysteresis=A_threshold−I_threshold) and/or the output signal from the sensor management component 1102 or sensor component. The relation between the sensing distance hysteresis and signal level hysteresis for a sensor component can be product specific (e.g., specific to the design, fabrication, type, or other feature of a sensor component).

Figure 12:
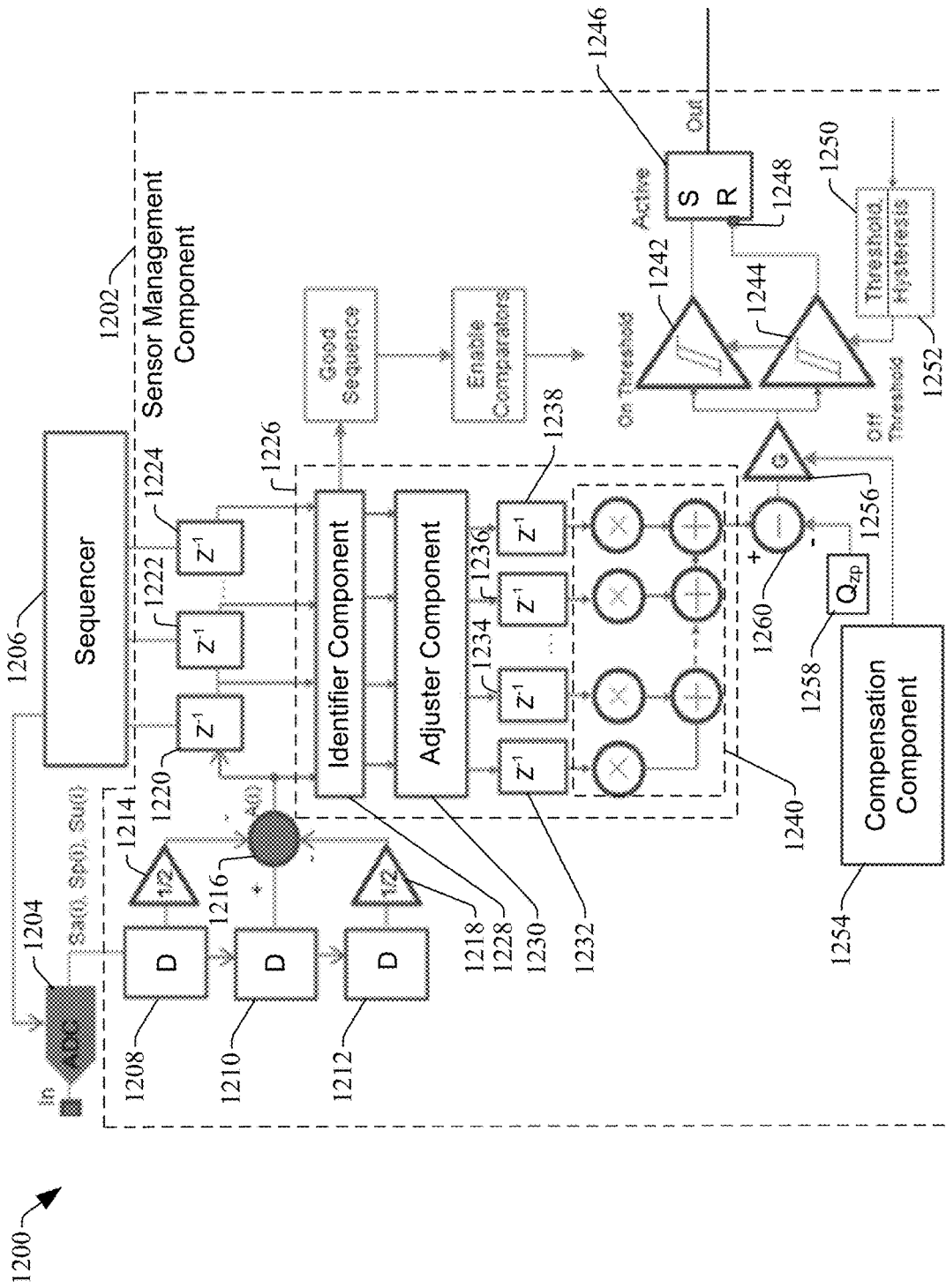
FIG. 12 presents a diagram of an example system that can employ temperature compensation to facilitate varying gain based on temperature, and combined signal processing and detection techniques, including outlier processing and linear filtering, to facilitate controlling the operation and state of a sensor component, in accordance with various aspects and embodiments of the disclosed subject matter.

FIG. 12 presents a diagram of an example system that can employ temperature compensation to facilitate varying gain based on temperature, and combined signal processing and detection techniques, including outlier processing and linear filtering, to facilitate controlling the operation and state of a sensor component, in accordance with various aspects and embodiments of the disclosed subject matter. The system 1200 can comprise a sensor management component 1202, an ADC component 1204, a sequencer component 1206, pre-pulse sampler component 1208, pulse sampler component 1210, post-pulse sampler component 1212, function component 1214, function component 1216, function component 1218, delay component 1220, delay component 1222, delay component 1224, signal processing component 1226, identifier component 1228, adjuster component 1230, delay components 1232, 1234, 1236, and 1238, subset of sub-components 1240 (e.g., summing or combining sub-components), comparator component 1242, comparator component 1244, function component 1246 (e.g., switch component), inverter component 1248, threshold component 1250, and defined hysteresis 1252 for the sensor component. These components can respectively operate in a manner similar to respective or corresponding components as described with regard to the system 900 of FIG. 9, system 1000 of FIG. 10, and/or system 1100 of FIG. 11.

The signal processing component 1226 can comprise a number of sub-components and perform a variety of functions. The signal processing component 1226 can be associated with (e.g., connected to) the function component 1216, the delay components 1220, 1222, and 1224, and/or other components of the sensor management component 1202. The identifier component 1228 of the signal processing component 1226 can analyze a sequence of pulses and can identify or determine whether the sequence is a good sequence of pulses, in accordance with defined sensor state criteria, as more fully disclosed herein. The identifier component 1228 also can identify any outlier pulse(s) in the sequence, wherein an outlier pulse can be identified or determined as more fully described herein.

The adjuster component 1230 of the signal processing component 1226 can adjust or substitute a value (e.g., amplitude or level) of any outlier pulse in the sequence to account for any noise or interference that may have caused such pulse to have an outlier value. For example, the adjuster component 1230 can adjust or replace the value of an outlier pulse to or with an average value or an extrapolated estimated value that can be based at least in part on (e.g., determined as a function of) the values of the pulses that were determined to be good pulses in the sequence.

The signal processing component 1226 can comprise a desired number of delay components, comprising delay components 1232, 1234, 1236, and 1238, that can be employed to facilitate holding or storing (e.g., temporarily) information relating to pulse values or pulse absence values (including an adjusted or a replacement value(s) for an outlier pulse(s)), determinations of pulses or pulse absences, or other information to facilitate determining an adjusted pulse signal strength for the pulse sequence to facilitate determining the state the sensor component is to be placed in, in response to the pulse signal, or portion thereof. The subset of sub-components 1240 (e.g., summing or combining sub-components) of the signal processing component 1226 can facilitate processing (e.g., summing or combining) the respective pulse sample values (e.g., good pulse sample values, adjusted pulse sample values for outlier pulses) associated with pulses or pulse absences in the sequence, for example, as respectively delayed by the delay components (e.g., 1232, 1234, 1236, and 1238), to facilitate determining, obtaining, or generating the adjusted pulse signal level for the pulse sequence, as more fully described herein.

The electronic gain of the sensor component can vary with the varying of the temperature of the sensor component (e.g., the temperature of the MCU of the sensor component). In accordance with aspects and implementations of the disclosed subject matter, the sensor management component 1202 can comprise a compensation component 1254 and a gain component 1256 (G). The gain component 1256 can have a variable gain that can be adjusted at calibration, wherein the adjustment to the gain can be made so that the sensor component can satisfy (e.g., meet) sensing range/on point at per the defined specification or standards for the sensor component. The gain component 1256 and the compensation component 1254 can control and modify the digital gain of the gain component 1256 to facilitate modifying the adjusted pulse signal level for the pulse sequence to generate a compensated adjusted pulse signal level, based at least in part on the temperature of the sensor component, to compensate the signal strength of the adjusted pulse signal level to account for and mitigate the variations in gain of the sensor component that can be caused by changes in temperature of the sensor component, and to provide a consistent (e.g., same or substantially the same) signal strength for a given target placed at a fixed position. Thus, as the overall gain for the sensor component varies with temperature, the gain of the gain component 1256 also can be adjusted, by the compensation component 1254 and/or gain component 1256, based at least in part on the temperature of the sensor component relative to a defined temperature of the sensor component at calibration, to compensate for the gain variation due to temperature variation to make the sensing range of the sensor component constant, or at least substantially constant, over variations in temperature of the sensor component.

The sensor management component 1202 can comprise a calibration signal component 1258 ($Q_{zp}$) that can comprise a default or calibration signal strength (e.g., a signal level or signal strength value) with no target or reflector present. The default or calibration signal strength can be determined for a defined temperature (e.g., defined temperature setting), such as, for example, a temperature of the sensor component (e.g., the MCU of the sensor component) when in a room at a room temperature (e.g., 25° C.) through experiments or simulations. Also, through experiments or simulations, for various temperatures of the sensor component (e.g., the MCU of the sensor component), various signal strengths and/or various changes in signal strengths from the default signal strength at those various temperatures can be determined or estimated. Also, through experiments or simulations, and based at least in part on the various signal strengths at the various temperatures, respective gain corrections (e.g., respective gain compensation or adjustment values) can be determined with respect to the various temperatures, wherein those respective gain corrections can be used to modify the adjusted pulse signal level to generate a compensated adjusted pulse signal level to compensate for a variation in gain of the sensor component based at least in part on a variation in temperature of the sensor component.

Generally, the higher the difference between the temperature of the sensor component at a given time of measurement and the defined temperature at calibration, the more gain adjustment that can be applied to adjust the gain for the adjusted pulse signal. For instance, the higher the positive-value temperature difference between the temperature of the sensor component at a given time of measurement and the defined temperature at calibration, the lower the gain adjustment factor (e.g., gain adjustment value) can be. For example, the gain adjustment factor can be at 1.00 (e.g., representing no gain adjustment) when the temperature difference is zero, and as the temperature of the sensor component increases (where such temperature is greater than the defined temperature at calibration), thereby increasing the temperature difference relative to the defined temperature, the gain adjustment factor can progressively decrease from 1.00, which can result in a compensated adjusted pulse signal level that is lower than the adjusted pulse signal level when the gain adjustment factor is applied to (e.g., multiplied with) the adjusted pulse signal level. Conversely, the higher the negative-value temperature difference between the temperature of the sensor component at a given time of measurement and the defined temperature at calibration (e.g., when the temperature of the sensor component at a given time is lower than the defined temperature at calibration), the higher the gain adjustment factor (e.g., gain adjustment value) can be. For example, the gain adjustment factor can be at 1.00 (e.g., representing no gain adjustment) when the temperature difference is zero, and as the temperature of the sensor component decreases, thereby increasing the temperature difference (a negative value) relative to the defined temperature, the gain adjustment factor can progressively increase from 1.00, which can result in a compensated adjusted pulse signal level that is higher than the adjusted pulse signal level when the gain adjustment factor is applied to (e.g., multiplied with) the adjusted pulse signal level.

The sensor management component 1202 can comprise a function component 1260 that can be associated with (e.g., connected to) the signal processing component 1226 (e.g., associated with a sub-component (e.g., a summing or combining sub-component) of the subset of sub-components 1240 of the signal processing component 1226). The function component 1260 also can be associated with (e.g., connected to) the calibration signal component 1258, and can receive the default or calibration signal strength from the calibration signal component 1258. The function component 1260 can receive the adjusted pulse signal level from the signal processing component 1226, wherein the function component 1260 can analyze the adjusted pulse signal with respect to (e.g., against) the default signal strength to determine, calculate, or detect a difference between the adjusted pulse signal and the default signal strength, wherein the adjusted pulse signal can vary in strength from the default signal strength due at least in part to a variation in temperature of the sensor component from the defined temperature associated with the default signal strength and used for calibration purposes.

The function component 1260 can communicate a difference signal, comprising a difference data value, that can indicate the difference between the adjusted pulse signal strength and the default signal strength to the gain component 1256. The gain component 1256 or the compensation component 1254 can comprise or can reference (e.g., access and analyze) compensation data (e.g., gain adjustment data) that can be used to facilitate compensating for the variation in the strength of the adjusted pulse signal from the default signal strength due in part to a variation in the temperature of the sensor component from the defined temperature based at least in part on the difference data value received from the function component 1260. For instance, the gain component 1256 or the compensation component 1254 can comprise or be associated with a data store that can store the compensation data, wherein the compensation data can be in a look-up table, for example. The compensation data can associate (e.g., map, link) respective gain adjustments to be made to the gain of the gain component 1256 to respective difference data values, which can reflect the respective differences in temperature between the current temperature of the sensor component and the defined temperature used for calibration of the sensor component. The gain component 1256 or the compensation component 1254 can access or reference the compensation data and can determine an adjustment to be made to the gain of the gain component 1256 to compensate for the variation in the temperature of the sensor component from the defined temperature based at least in part on (e.g., as a function of) the difference data value.

The gain component 1256 or the compensation component 1254 can modify (e.g., adjust) the adjusted pulse signal to generate a compensated adjusted pulse signal based at least in part on the gain adjustment that corresponds to the difference data value based at least in part on the compensation data. For instance, the gain component 1256 or the compensation component 1254 can multiply the value of the adjusted signal strength by the gain adjustment value to produce the compensated adjusted signal strength. The gain component 1256 can output the compensated adjusted pulse signal to the inputs of comparator component 1242 and comparator component 1244. It is noted that, if the difference data value is zero, which can indicate that the temperature of the sensor component is the same as the defined temperature of the sensor component used for calibration, the gain component 1256 or compensation component 1254 does not have to modify the adjusted pulse signal, and the gain component 1256 can output the adjusted pulse signal to the inputs of comparator component 1242 and comparator component 1244.

When the signal processing component 1226 determines that a pulse sequence is a good pulse sequence, the signal processing component 1226 can enable the comparator component 1242 and/or the comparator component 1244 to facilitate comparing the adjusted (or compensated adjusted) pulse signal level for the pulse sequence that is output from the gain component 1256 to the defined threshold active level associated with comparator component 1242 and/or the defined threshold inactive level associated with comparator component 1244. For instance, in response to receiving the adjusted (or compensated adjusted) pulse signal level for the pulse sequence, the comparator component 1242 can compare the adjusted (or compensated adjusted) pulse signal level to the defined threshold active level. If the adjusted (or compensated) pulse signal level is higher than the defined threshold active level, the comparator component 1242 can provide an output signal (e.g., a high signal) that can indicate that the adjusted (or compensated) pulse signal level exceeded the defined threshold active level for placing the sensor component in the on state. If the adjusted (or compensated) pulse signal level is not higher than the defined threshold active level, the comparator component 1242 can provide an output signal (e.g., a low signal) that can indicate that the adjusted (or compensated adjusted) pulse signal level does not exceed the defined threshold active level for placing the sensor component in the on state. The output signal of the comparator component 1242 can be provided to function component 1246 (e.g., switch component) to facilitate determining the state in which the sensor component is to be placed.

With regard to comparator component 1244, in response to receiving the adjusted (or compensated adjusted) pulse signal level for the pulse sequence, the comparator component 1244 can compare the adjusted (or compensated adjusted) pulse signal level to the defined threshold inactive level. If the adjusted (or compensated adjusted) pulse signal level is lower than the defined threshold inactive level, the comparator component 1244 can provide an output signal (e.g., a high signal) that can indicate that the adjusted (or compensated adjusted) pulse signal level is below the defined threshold inactive level for placing the sensor component in the off state. If the adjusted (or compensated adjusted) pulse signal level is not lower than the defined threshold inactive level, the comparator component 1244 can provide an output signal (e.g., a low signal) that can indicate that the adjusted (or compensated adjusted) pulse signal level is not below the defined threshold inactive level for placing the sensor component in the off state. The output signal of the comparator component 1244 can be provided to an inverter component 1248 associated with the function component 1246 (e.g., switch component), wherein the inverter component 1248 can change the output signal (e.g., high signal) from the comparator component 1244 to an inverted signal (e.g., a low signal) that can be input to the function component 1246. The signal input to the function component 1246 can be used (e.g., analyzed) by the function component 1246 to facilitate determining the state in which the sensor component is to be placed. The output signal from the function component 1246 can indicate whether the sensor component is to be in the on state or off state, wherein the sensor management component 1202 can determine the state the sensor component is to be in, and/or whether to change the state of the sensor component, based at least in part on the output signal from the function component 1246.

The comparator component 1242 and comparator component 1244 can be associated with a threshold component 1250, wherein the comparator component 1242 can receive, from the threshold component 1250, threshold information relating to the defined threshold active level for placing (e.g., switching) the sensor component in the on state, and the comparator component 1244 can receive, from the threshold component 1250, threshold information relating to the defined threshold inactive level for placing (e.g., switching) the sensor component in the off state. The threshold component 1250 also can be related to a defined hysteresis 1252 for the sensor component, wherein the defined hysteresis 1252 can be determined or defined based at least in part on the difference between the defined threshold active level and the defined threshold inactive level (e.g., Hysteresis=A_threshold−I_threshold) and/or the output signal from the sensor management component 1202 or sensor component. The relation between the sensing distance hysteresis and signal level hysteresis for a sensor component can be product specific (e.g., specific to the design, fabrication, type, or other feature of a sensor component).

Figure 13:
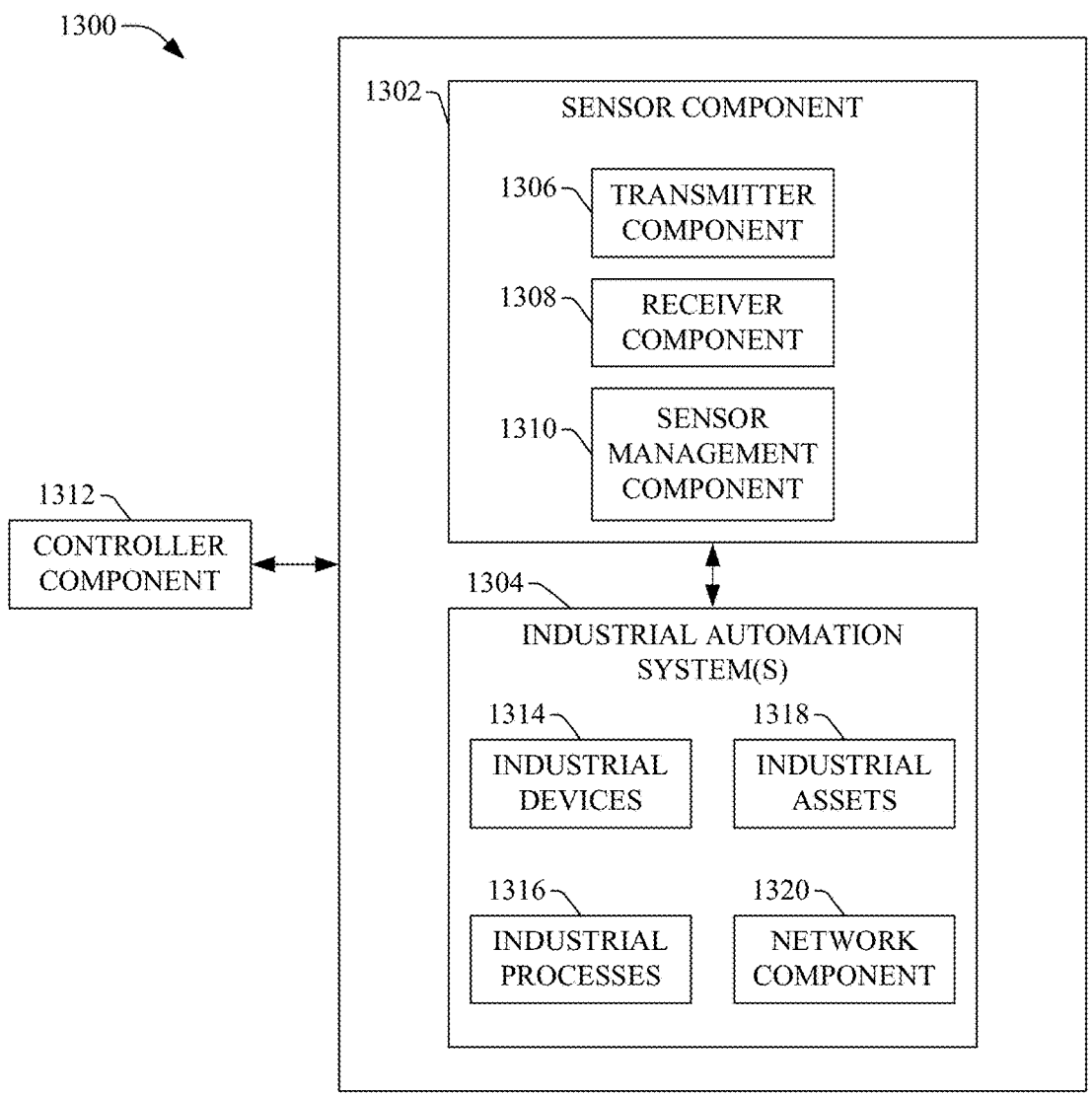
FIG. 13 depicts a block diagram of an example system that can control the operation and state of a sensor component, in connection with operation of an industrial automation system(s), in accordance with various aspects and embodiments of the disclosed subject matter.

FIG. 13 depicts a block diagram of an example system 1300 that can control the operation and state (e.g., switching state) of a sensor component, in connection with operation of an industrial automation system(s), in accordance with various aspects and embodiments of the disclosed subject matter. The system 1300 can comprise one or more sensor components, comprising a sensor component 1302, which can reside within or be associated with an industrial automation system 1304. The sensor component 1302 can comprise a transmitter component 1306, a receiver component 1308, and a sensor management component 1310, wherein the transmitter component 1306, receiver component 1308, and sensor management component 1310 can be associated with (e.g., communicatively and/or optically connected to) each other. The sensor component 1302, transmitter component 1306, receiver component 1308, and sensor management component 1310 respectively can be the same as or similar to, and can comprise the same or similar functionality as, respective components, as more fully described herein.

The system 1300 also can comprise a controller component 1312 that can be associated with the industrial automation system 1304 and the components (e.g., sensor component 1302, industrial device(s) 1314, industrial process(es) 1316, industrial asset(s) 1318, and/or network component 1320) therein. The controller component 1312 can comprise one or more controllers that can be designed, configured, or programmed to perform various functions and control respective devices (e.g., industrial device 1314), processes (e.g., industrial process 1316), assets (e.g., industrial asset 1318), or components (e.g., sensor component 1302, network component 1320) of the industrial automation system 1304. The controller component 1312 also can comprise a data store 1322 that can store information (e.g., control-related information, configuration information, algorithms, or other information).

The controller component 1312 can be associated with (e.g., communicatively connected to) the industrial automation system 1304 to facilitate controlling operation of the industrial automation system 1304. The industrial automation system 1304 can comprise one or more industrial devices 1314, one or more industrial processes 1316, and one or more industrial assets 1318, that can be distributed throughout an industrial facility(ies) in accordance with a desired industrial-automation-system configuration. The industrial automation system 1304 can perform industrial processes or other actions to facilitate producing desired products, processed materials, etc., as an output.

The industrial automation system 1304 also can include the network component 1320 that can comprise network-related devices (e.g., communication devices, routers (e.g., wireline or wireless routers), switches, etc.), wherein respective network-related devices can be connected to or interfaced with certain other network-related devices to form a communication network having a desired communication network configuration. One or more network-related devices of the network component 1320 can be associated with (e.g., integrated with, interfaced with, and/or communicatively connected to) the various industrial devices 1314, industrial processes 1316, and/or other industrial assets 1318 of the industrial automation system 1304 to facilitate communication of information (e.g., command or control information or signals, parameter data, configuration data, status information, production information, etc.) between the various industrial devices 1314, industrial processes 1316, and/or other industrial assets 1318 via the network component 1320. The network component 1320 also can be associated with (e.g., interfaced with and/or communicatively connected to) the controller component 1312 to facilitate communication of data between the industrial automation system 1304 and the controller component 1312.

The sensor component 1302 can be associated with one or more of the controller component 1312, industrial device 1314, industrial process 1316, industrial asset 1318, and/or network component 1320 to facilitate operation of the industrial automation system 1304, in response to operation of the sensor component 1302. For example, if the sensor component 1302 is associated with an industrial device 1314, operation of the industrial device 1314 can be based at least in part on the operation of the sensor component 1302, such as the changing of switching states of the sensor component 1302. As another example, if the sensor component 1302 is associated with the controller component 1312, information relating to the operation of the sensor component 1302 (e.g., information relating to the changing of switching states of the sensor component 1302) in relation or response to the operation of the industrial automation system 1304 can be communicated from the sensor component 1302 to the controller component 1312. In response to the operation information from the sensor component 1302, the controller component 1312 can facilitate making a determination(s) and/or controlling operation of the industrial automation system 1304.

Figure 14:
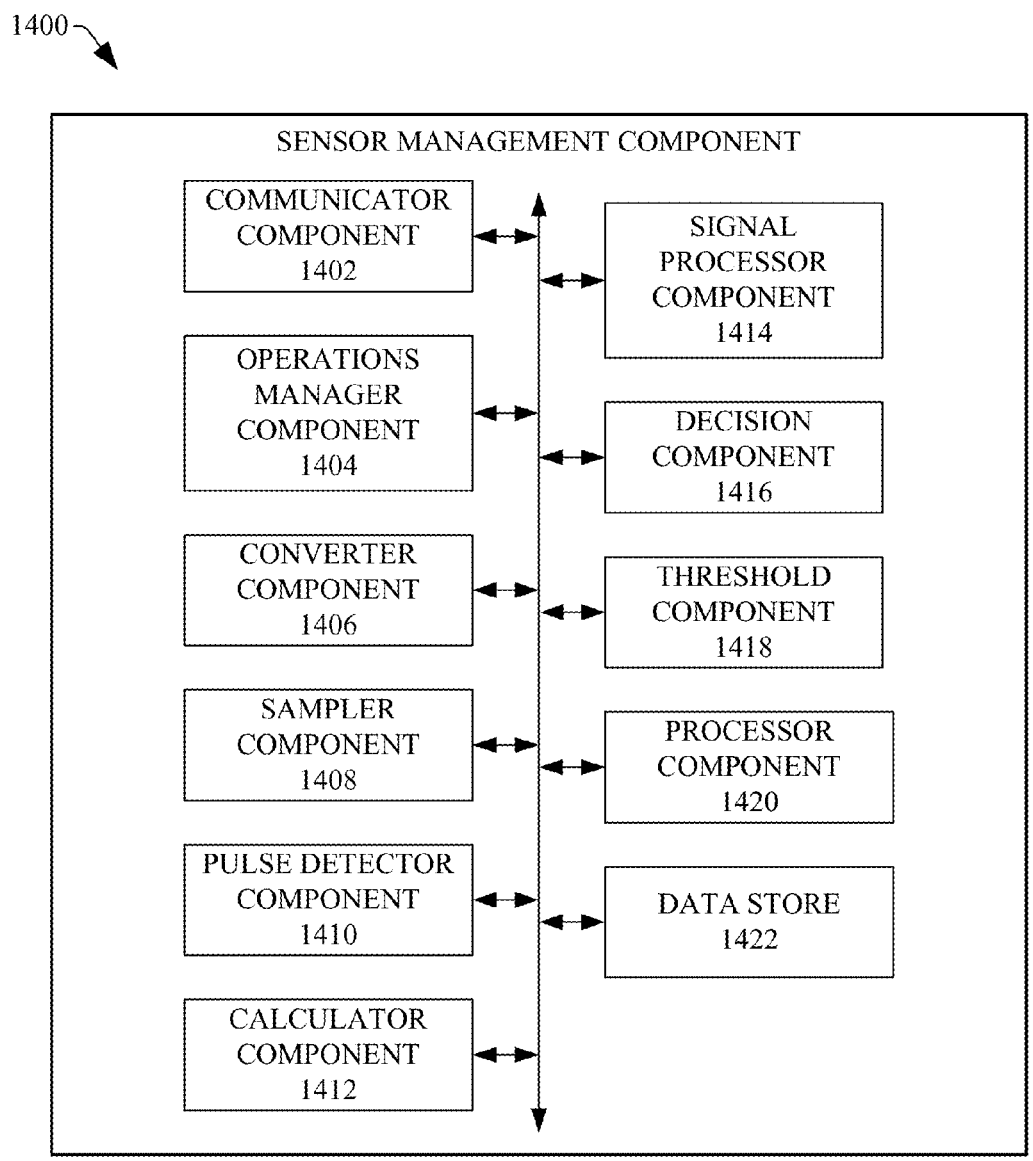
FIG. 14 depicts a block diagram of an example sensor management component that can control the operation and state of a sensor component, in accordance with various aspects and embodiments of the disclosed subject matter.

FIG. 14 depicts a block diagram of an example sensor management component 1400 that can control the operation and state (e.g., switching state) of a sensor component, in accordance with various aspects and embodiments of the disclosed subject matter. The sensor management component 1400 can comprise a communicator component 1402 that can transmit information to another component(s) or receive information from another component(s). For instance, the communicator component 1402 can facilitate communication (e.g., transmission, receiving) of information between a sensor component and another component(s) (e.g., a controller component (e.g., PLC), an industrial device), associated with (e.g., communicatively connected to) the sensor management component 1400. The communicator component 1402 can communicate with the other component(s) via a wireline or wireless connection using virtually any desired type of wireline or wireless communication technology (e.g., broadband, Wi-Fi, WiMax, cellular, digital subscriber line (DSL)-type communication technology, T-1, T-3, optical carrier communication technology (e.g., synchronous optical networking (SONET)), etc.). The information can comprise information relating to the sensor component, a controller component, or industrial automation systems (e.g., industrial device, industrial process, industrial asset, or network component, associated with an industrial automation system).

The sensor management component 1400 also can comprise an operations manager component 1404 that can control or manage operations relating to the sensor component. The operations manager component 1404 also can control operations being performed by various components of the sensor management component 1400, controlling data flow between various components of the sensor management component 1400, controlling data flow between the sensor management component 1400 and other components or devices, etc.

The sensor management component 1400 further can include (or be associated with) a converter component 1406 that can facilitate converting analog signals to digital signals, or converting digital signals to analog signals. The converter component 1406 can comprise an ADC component to convert analog signals to digital signals and a DAC component to convert digital signals to analog signals. For example, the converter component 1406 (e.g., using the ADC component) can convert an analog pulse signal, which can be received by a receiver component of the sensor component, to a digital pulse signal. The converter component can sample the analog pulse signal at a desired speed to facilitate generating the corresponding digital pulse signal.

The sensor management component 1400 also can comprise a sampler component 1408 that can sample the pulse signal (e.g., a digital pulse signal) prior to the pulse time period (in between the last pulse time period and the pulse time period), during the pulse time period, and after the pulse time period (but before the next time period) to facilitate generating or obtaining a pre-pulse sample, a pulse sample, and a post-pulse sample, respectively, from the pulse signal, in connection with all or a desired portion of the pulse time periods for the pulse signal.

The sensor management component 1400 further can include a pulse detector component 1410 that can detect pulses or pulse absences in the pulse signal during the pulse time periods. The pulse time periods can be periodic or non-periodic, and can based at least in part on a defined sequence or a pseudo-random sequence. The pulse detector component 1410 also can detect, measure, or determine the pulse amplitude of a pulse as a function of the pulse sample level, pre-pulse sample level, and post-pulse sample level, as more fully disclosed herein.

The sensor management component 1400 can contain a calculator component 1412 that can perform various calculations or computations on data, such as data relating to pulse samples (e.g., pulse sample values or amplitudes), pre-pulse samples, post-pulse samples, defined ranges for good samples, various types of threshold determinations, in accordance with various equations, including the equations disclosed herein. The calculator component 1412 can generate results based at least in part on the calculations performed by the calculator component 1412.

The sensor management component 1400 also can comprise a signal processor component 1414 that can process analog or digital signals associated with the sensor component. For instance, the signal processor component 1414 can process the pulse signal and/or pulse samples to facilitate filtering out ambient light noise, noise spikes, random noise, or other noise that may be in the pulse signal and/or pulse samples. This can mitigate the negative effects that such noise may have on making state determinations for the sensor component to facilitate reducing, mitigating, or minimizing errors being made in state determinations for the sensor component. The signal processor component 1414 also can facilitate identifying outlier pulse samples in a sequence of pulse samples. The signal processor component 1414 further can process pulse signal strength values to facilitate adjusting pulse signal strength values to account for (e.g., reduce the effects of) noise that may have caused the outlier pulse samples in the sequence. For example, the signal processor component 1414 further can process a pulse signal strength value of an outlier pulse to adjust or replace the pulse signal strength value to or with a different pulse signal strength value, such as an average pulse signal strength for the sequence of pulses in which the outlier pulse resides.

The sensor management component 1400 also can comprise a decision component 1416 that can make decisions or determinations, based at least in part on data associated with the sensor component, to facilitate controlling switching of the sensor component between the on state or off state, controlling data flow between the sensor component and another component, or performing other operations associated with the sensor component. For instance, the decision component 1416 can render decisions regarding whether to change the state of the sensor component based at least in part on analysis of data relating to pulse samples, pre-pulse samples, post-pulse samples, good pulses, outlier pulses, defined sensor state criteria, threshold values, an algorithm(s) (e.g., the defined combined signal processing and pulse detection algorithm), or other data.

The sensor management component 1400 further can include a threshold component 1418 that can comprise data relating to the various thresholds that can be employed by the sensor management component 1400 to facilitate performing the various operations of the sensor management component 1400 in connection with controlling switching of the sensor component between the on state or off state. The threshold levels can comprise, for example, the defined threshold illumination level, defined threshold pulse level, defined threshold pulse absence level, defined threshold number of good (e.g., acceptable) pulse samples in a sequence, defined threshold active level, and defined threshold inactive level.

The sensor management component 1400 can comprise a processor component 1420 that can be associated with (e.g., communicatively connected to) the various components (e.g., communicator component 1402, operations manager component 1404, converter component 1406, etc.) of the sensor management component 1400. The processor component 1420 can operate in conjunction with the other components (e.g., communicator component 1402, operations manager component 1404, converter component 1406, etc.) of the sensor management component 1400 to facilitate performing the various functions and operations of the sensor management component 1400. The processor component 1420 can employ one or more processors, microprocessors, or controllers that can process data, such as information relating to pulse signals, pulse sampling, signal processing, state determinations for the sensor component, industrial automation systems, applications, and/or devices or components associated with the sensor management component 1400, to facilitate controlling communication of data between the sensor management component 1400 and other devices or components (e.g., controller component, industrial device, network component) or performing other operations of the sensor management component 1400, as more fully disclosed herein.

The sensor management component 1400 can contain a data store 1422 that can store data structures (e.g., user data, code, control data, metadata), code structure(s) (e.g., modules, objects, hashes, classes, procedures) or instructions, and/or information relating to pulse signals, pulse sampling, signal processing, state determinations for the sensor component, industrial automation systems, applications, and/or devices or components associated with the sensor management component 1400. The processor component 1420 can be functionally coupled (e.g., through a memory bus) to the data store 1422 in order to store and retrieve information desired to operate and/or confer functionality, at least in part, to the components (e.g., communicator component 1402, operations manager component 1404, converter component 1406, etc.) of the sensor management component 1400, and/or substantially any other operational aspects of the sensor management component 1400.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 15:
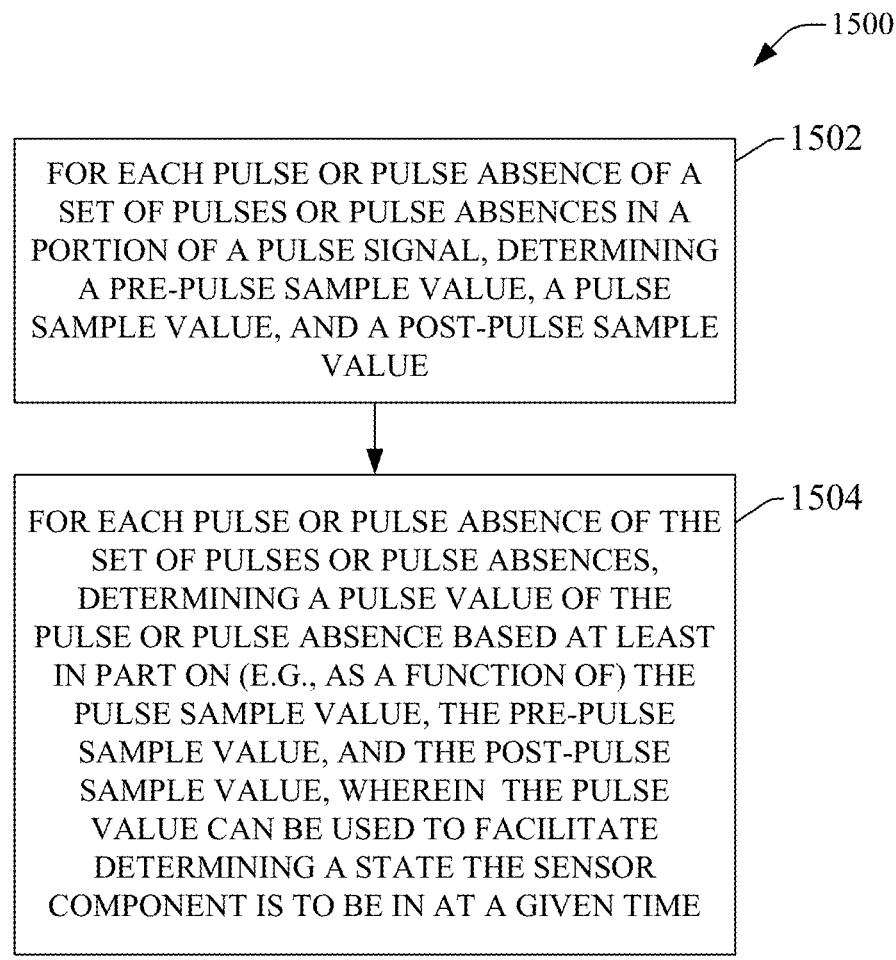
FIG. 15 is a diagram of a flowchart of an example method that can control the operation and state of a sensor component, in accordance with various aspects and implementations of the disclosed subject matter.
Figure 16:
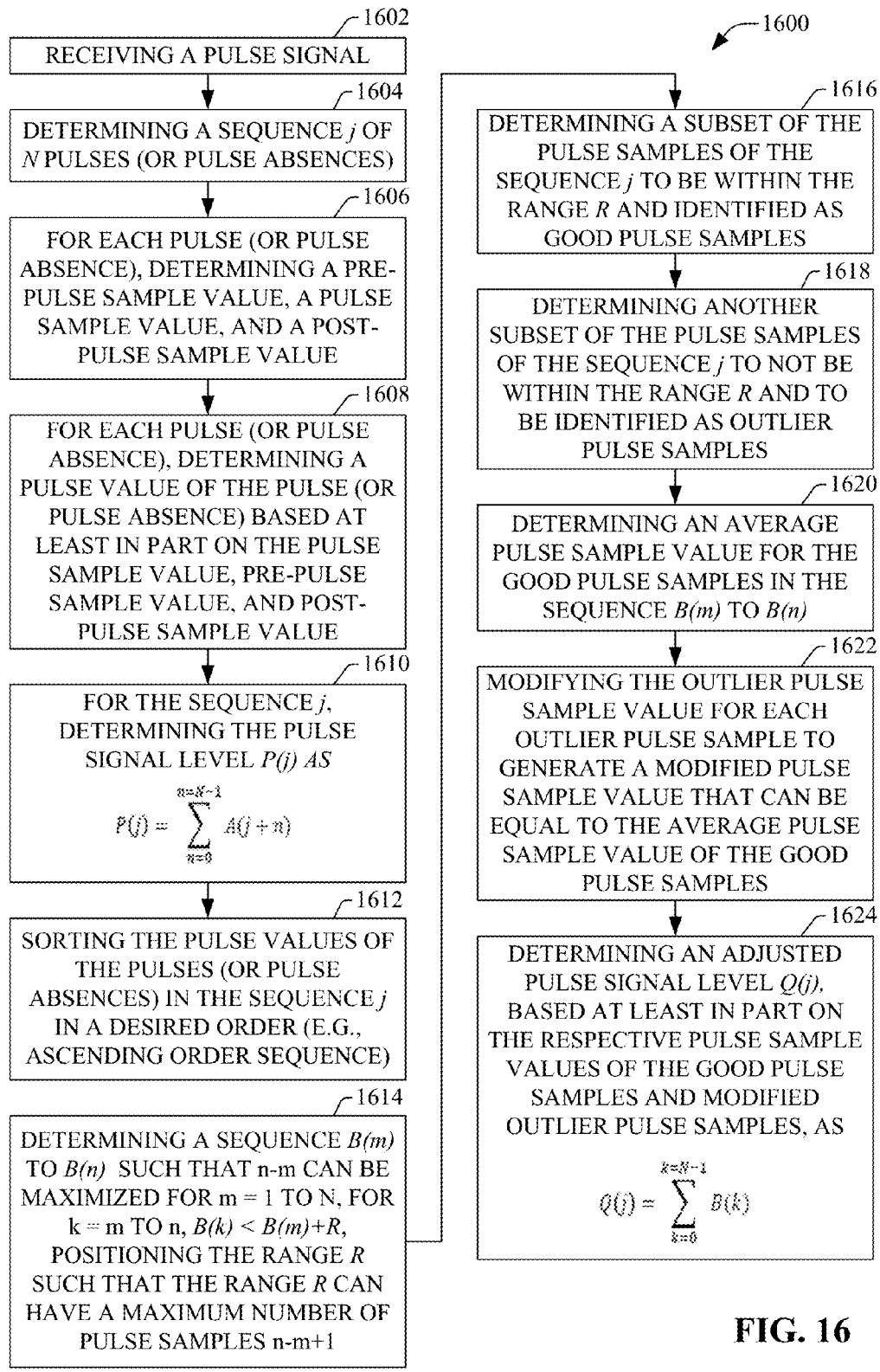
FIG. 16 presents a flow diagram of another example method that can determine an adjusted pulse signal level, which can account for any outlier pulse samples in a sequence of pulse samples, to facilitate controlling the operation and state of a sensor component, in accordance with various aspects and implementations of the disclosed subject matter.
Figure 17:
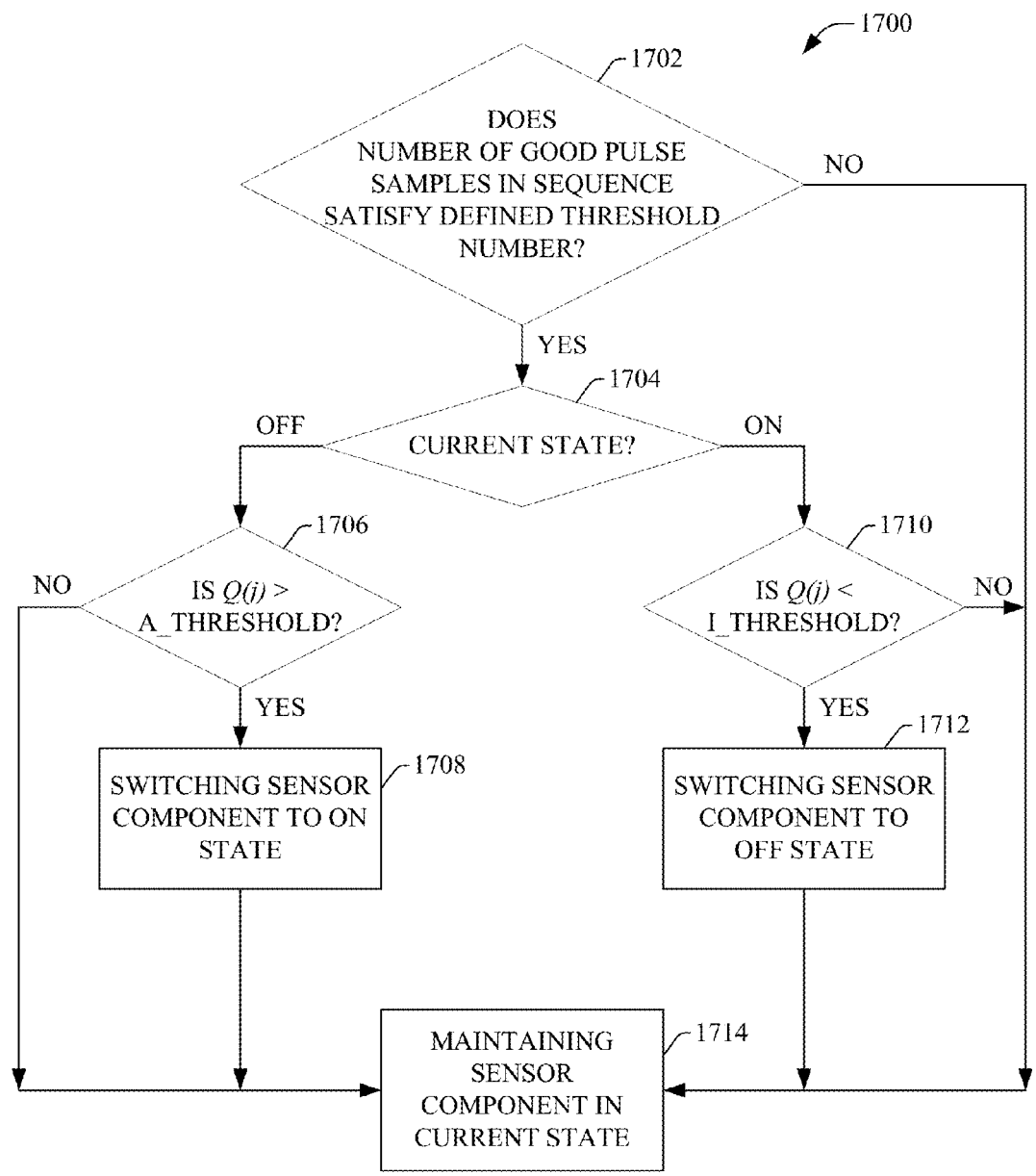
FIG. 17 illustrates a flow diagram of an example method that can facilitate determining whether to change a state of a sensor component, in accordance with aspects of the disclosed subject matter.

In view of the example systems described above, example methods that can be implemented in accordance with the disclosed subject matter can be better appreciated with reference to flowcharts in FIGS. 15-17. For purposes of simplicity of explanation, various methods disclosed herein are presented and described as a series of acts; however, it is to be understood and appreciated that the subject disclosure is not limited by the order of acts, as some acts may occur in different order and/or concurrently with other acts from that shown and described herein. It is noted that not all illustrated acts may be required to implement a described method in accordance with the subject specification. In addition, for example, one or more methods disclosed herein could alternatively be represented as a series of interrelated states or events, such as in a state diagram. Moreover, interaction diagram(s) or call flow(s) represent several of the example methods disclosed herein in accordance with the described subject matter; particularly in instances when disparate entities, or functional elements, enact disparate portions of one or more of the several methods. Furthermore, two or more of the disclosed example methods can be implemented in combination, to accomplish one or more features or advantages described in the subject disclosure.

FIG. 15 is a diagram of a flowchart of an example method 1500 that can control the operation and state (e.g., switching state) of a sensor component, in accordance with various aspects and implementations of the disclosed subject matter. The method 1500 can be implemented by a sensor component that can comprise a sensor management component.

At 1502, for each pulse or pulse absence of a set of pulses or pulse absences in a portion of a pulse signal, a pre-pulse sample value, a pulse sample value, and a post-pulse sample value can be determined. A transmitter component of a sensor component can generate a pulse signal comprising pulses (e.g., light pulses) of respective pulse values (e.g., amplitudes), wherein the pulses (or pulse absences) can be, for example, at periodic or at least known times in the pulse signal. The transmitter component can present the pulse signal as an output, wherein the pulse signal can be used to facilitate switching the sensor component between an on state and off state. A receiver component of the sensor component can receive or detect the pulse signal.

The sensor management component can be associated with the receiver component, and can analyze and process the pulse signal. The sensor management component can analyze and process signal to facilitate determining whether or not a target (e.g., object) is present based at least in part on whether a pulse or a pulse absence is detected, depending in part on the type of sensor the sensor component is. For example, when the sensor component comprises a diffuse sensor, a pulse detected by the receiver component (e.g., as determined by the sensor management component) can indicate the presence of a target (e.g., an object interfering with or in the way of the light beam being transmitted from the transmitter component to the receiver component), and detection of a pulse absence by the receiver component (e.g., as determined by the sensor management component) can indicate the lack of presence of a target. As another example, when the sensor component comprises a polarized photo reflective sensor, a pulse absence detected by the receiver component (e.g., as determined by the sensor management component) can indicate the presence of a target, and detection of a pulse by the receiver component (e.g., as determined by the sensor management component) can indicate the lack of presence of a target. For each pulse or pulse absence of a set of pulses or pulse absences in the portion of the pulse signal, the sensor management component can determine a pre-pulse sample value, a pulse sample value (wherein the pulse sample value can be for a pulse or a pulse absence), and a post-pulse sample value to facilitate processing the pulse or pulse absence and accurately determining the value (e.g., amplitude) of the pulse or pulse absence.

At 1504, for each pulse or pulse absence of the set of pulses or pulse absences, a pulse value of the pulse or pulse absence can be determined based at least in part on (e.g., as a function of) the pulse sample value, the pre-pulse sample value, and the post-pulse sample value, wherein the pulse value can be used to facilitate determining a state the sensor component is to be in at a given time. The sensor management component can determine (e.g., calculate) the pulse value of the pulse or pulse absence based at least in part on the pulse sample value, the pre-pulse sample value, and the post-pulse sample value.

For example, the sensor management component can calculate the pulse value (Ap) (e.g., the amplitude) of the pulse or pulse absence as being equal to the pulse sample value (Sp) (e.g., amplitude) of the pulse sample minus the average of the pre-pulse sample value (Sa) and the post-pulse sample value (Su) (e.g., Ap=Sp−(Sa+Su)/2). By taking the pre-pulse sample and post-pulse sample, along with the pulse sample, in connection with a pulse or pulse absence, and determining the pulse value of the pulse or pulse absence as a function of the pulse sample value, the pre-pulse sample value, and the post-pulse sample value, the sensor management component can remove all or at least a portion of the pulse sample value that can be caused by and/or attributed to ambient noise or other noise. This can facilitate mitigating the negative effects of ambient or other noise in connection with determining the state (e.g., on state, off state) a sensor component is to be in at a given time and can enable the sensor management component to more accurately determine the state a sensor component is to be in at a given time, as compared to conventional systems, methods, and techniques. The pulse values of the pulses or pulse absences can be used to facilitate determining a state the sensor component is to be in at a given time.

FIG. 16 presents a flow diagram of another example method 1600 that can determine an adjusted pulse signal level, which can account for any outlier pulse samples in a sequence of pulse samples, to facilitate controlling the operation and state (e.g., switching state) of a sensor component, in accordance with various aspects and implementations of the disclosed subject matter. The method 1600 can be implemented by a sensor component that can comprise a sensor management component.

At 1602, a pulse signal can be received. A transmitter component of a sensor component can generate a pulse signal comprising pulses (e.g., light pulses) of respective pulse values (e.g., amplitudes). The transmitter component can present (e.g., emit, transmit) the pulse signal as an output, wherein the pulse signal can be used to facilitate switching the sensor component between an on state and off state based at least in part on whether the pulse signal, or portion thereof, as received or detected by a receiver component of the sensor component, contains pulses or pulse absences.

At 1604, a sequence j of N pulses (or pulse absences) can be determined or defined. The sensor management component can determine or define a portion of the pulse signal, which can be a sequence j comprising N pulses (or pulse absences), wherein N can be virtually any desired number.

At 1606, for each pulse (or pulse absence) of a set (e.g., N) of pulses (or pulse absences) in the sequence j, a pre-pulse sample value, a pulse sample value, and a post-pulse sample value can be determined. The sensor management component, which can be associated with the receiver component, can analyze and process the pulse signal. For each pulse (or pulse absence) of the set of pulses (or pulse absences) in the sequence (e.g., in a portion of the pulse signal), the sensor management component can determine a pre-pulse sample value, a pulse sample value, and a post-pulse sample value, wherein the respective values can be respective amplitude levels.

At 1608, for each pulse (or pulse absence) of the set of pulses (or pulse absences) in the sequence j, a pulse value of the pulse (or pulse absence) can be determined based at least in part on (e.g., as a function of) the pulse sample value, the pre-pulse sample value, and the post-pulse sample value. The sensor management component can determine (e.g., calculate) the pulse value (Ap) (e.g., the amplitude) of the pulse (or pulse absence) as being equal to the pulse sample value (Sp) (e.g., amplitude) of the pulse sample minus the average of the pre-pulse sample value (Sa) and the post-pulse sample value (Su) (e.g., Ap=Sp−(Sa+Su)/2). The pulse value (Ap) can have a relatively high value for a pulse and a relatively low value for a pulse absence.

At 1610, for the sequence j, the pulse signal level, P(j), can be determined as:

$$P(j) = \sum_{n=0}^{n=N-1} A(j+n)$$

wherein the sensor management component can determine (e.g., calculate) the pulse signal level as a function of the respective pulse values of the sequence.

At 1612, the pulse values of the pulses (or pulse absences) in the sequence j can be sorted (e.g., arranged) in a desired order (e.g., ascending order sequence). To facilitate identifying and removing (or modifying) outlier pulse samples in the sequence j, the sensor management component can sort the pulse values (A(i)) of the pulses (or pulse absences) in the sequence j for i=j to j+N in an ascending order sequence B(k), k=0 to N−1.

At 1614, a sequence B(m) to B(n) can be determined such that n−m can be maximized for m=1 to N, for k=m to n, B(k)<B(m)+R, positioning the range R such that the range R can have a maximum number of pulse samples n−m+1. The sensor management component can determine or identify the sequence B(m) to B(n) such that n−m can be maximized for m=1 to N, for k=m to n, B(k)<B(m)+R, and position the range R such that the range R can have a maximum number of pulse samples n−m+1.

At 1616, a subset of the pulse samples of the sequence j can be determined to be within the range R and identified as good pulse samples. At 1618, another subset of the pulse samples of the sequence j can be determined to not be within the range R and can be identified as outlier pulse samples. The sensor management component can analyze the pulse samples in relation to the defined range R, and can determine or identify which pulse samples are within the defined range R, and can identify those pulse samples as being good or acceptable pulse samples (e.g., non-outlier pulse samples). Also, based at least in part on the analysis results, the sensor management component can determine or identify which pulse samples are not within the defined range R, and can identify such pulse samples as being outlier pulse samples.

At 1620, an average pulse sample value can be determined for the good pulse samples in the sequence B(m) to B(n). The sensor management component can determine (e.g., calculate) the average pulse sample value for the good pulse samples in the sequence B(m) to B(n).

At 1622, the outlier pulse sample value for each outlier pulse sample can be modified to generate, or replaced with, a modified pulse sample value that can be equal to the average pulse sample value of the good pulse samples. The sensor management component can modify or replace the outlier pulse sample value for each outlier pulse sample (e.g., pulse sample(s) wherein k<m or k>n) to generate the modified pulse sample value. This can mitigate (e.g., reduce, minimize) errors in state determinations for the sensor component that can result from spike noise or other noise that may have caused the outlier pulse samples.

At 1624, an adjusted pulse signal level Q(j) can be determined based at least in part on the respective pulse sample values of the good pulse samples and modified outlier pulse samples. The sensor management component can determine (e.g., calculate) the adjusted pulse signal level Q(j) as a function of the respective pulse sample values of the good pulse samples and modified outlier pulse samples. For example, the sensor management component can calculate Q(j) as follows:

$$Q(j) = \sum_{k=0}^{k=N-1} B(k)$$

wherein this adjusted pulse signal level Q(j) can be used by the sensor management component to facilitate determining whether to change the state of the sensor component or not (e.g., in accordance with method 1700, as depicted by FIG. 17).

FIG. 17 illustrates a flow diagram of an example method 1700 that can facilitate determining whether to change a state of a sensor component, in accordance with aspects of the disclosed subject matter. The method 1700 can be implemented by a sensor component that can comprise a sensor management component. The method 1700 can be employed, for example, to facilitate determining whether to change the state of a sensor component based at least in part on the adjusted pulse signal level Q(j) (e.g., as determined in accordance with the method 1700), the number of pulse samples (e.g., acceptable pulse samples) in the sequence j, and an applicable signal strength threshold level.

At 1702, a determination can be made regarding whether the number of good pulse samples in the sequence satisfies a defined threshold number of good pulse samples. Pulse samples can be associated with a pulse or pulse absence depending in part on their amplitude or value. The sensor management component can determine whether there are a sufficient number of good (e.g., acceptable) pulse samples in the sequence to satisfy (e.g., to exceed) the defined threshold number of good pulse samples. For example, the number of good pulse samples for the sequence can be n−m+1, the defined threshold number of good pulse samples can be M, wherein the sensor management component can determine whether the number of good pulse samples n−m+1>M. The defined threshold number of good pulse samples (e.g., M) can be determined, selected, and/or implemented (e.g., by the sensor management component) based at least in part on the value of N, which can be the number of pulses in the sequence j. For instance, M can be determined, selected, and/or implemented (e.g., by the sensor management component) such that M can be close to N to facilitate obtaining a desirable (e.g., optimal, maximized, or acceptable) robustness to noise. As an example, M can be set such that M=2N/3, as at least an acceptable starting point, wherein M can be refined as desired (e.g., if necessary).

If, at operation 1702, it is determined that the number of good pulse samples in the sequence does not satisfy the defined threshold number of good pulse samples, the method 1700 can proceed to operation 1714, wherein, at 1714, it can be determined that the sensor component is to remain in the current state. If the sensor management component determines that the number of good pulse samples in the sequence does not satisfy (e.g., is not greater than) the defined threshold number of good pulse samples, the sensor management component can determine that there are not enough good pulse samples in the sequence change the state of the sensor component, and can therefore determine that the sensor component is to remain in its current state.

If, at operation 1702, it is determined that the number of good pulse samples in the sequence does satisfy the defined threshold number of good pulse samples, the method 1700 can proceed to operation 1704, wherein, at 1704, a current state of the sensor component can be determined. If the sensor management component determines that the number of good pulse samples in the sequence does satisfy (e.g., is greater than) the defined threshold number of good pulse samples (e.g., M), the sensor management component can determine that there are enough good pulse samples in the sequence to further consider whether to change the state of the sensor component, and therefore, can determine the current state of the sensor component.

If, at operation 1704, it is determined that the sensor component is currently in the off state, at 1706, it can be determined whether the adjusted pulse signal level Q(j) is greater than a defined threshold active level for switching the sensor component from the off state to the on state. If the sensor management component determines that the sensor component is currently in the off state, the sensor management component can determine whether the adjusted pulse signal level Q(j) is greater than a defined threshold active level (e.g., A_threshold) for switching the sensor component from the off state (e.g., inactive state) to the on state (e.g., active state).

If, at operation 1706, it is determined that the adjusted pulse signal level Q(j) is greater than the defined threshold active level for switching the sensor component from the off state to the on state, at 1708, the sensor component can be switched from the off state to the on state, wherein the sensor component can remain in the on state (e.g., per reference numeral 1714), until, for example, it is determined that the state of the sensor component is to be changed to the off state. The sensor management component can switch the sensor component from the off state to the on state, in response to determining that the adjusted pulse signal level Q(j) is greater than the defined threshold active level (e.g., A_threshold).

If, at operation 1706, it is determined that the adjusted pulse signal level Q(j) is not greater than the defined threshold active level, the method 1700 can proceed to operation 1714, wherein, at 1714, it can be determined that the sensor component is to remain in its current off state. The sensor management component can determine that the sensor component is to remain in its current off state, in response to determining that the adjusted pulse signal level Q(j) is not greater than the defined threshold active level (e.g., A_threshold).

Referring again to operation 1704, if, at operation 1704, it is determined that the sensor component is currently in the on state, the method 1700 can proceed to operation 1710, wherein at 1710, it can be determined whether the adjusted pulse signal level Q(j) is less than a defined threshold inactive level for switching the sensor component from the on state to the off state. If the sensor management component determines that the sensor component is currently in the on state, the sensor management component can determine whether the adjusted pulse signal level Q(j) is less than the defined threshold inactive level (e.g., I_threshold) for switching the sensor component from the on state (e.g., active state) to the off state (e.g., inactive state).

If, at operation 1710, it is determined that the adjusted pulse signal level Q(j) is less than the defined threshold inactive level, at 1712, the sensor component can be switched from the on state to the off state, wherein the sensor component can remain in the off state (e.g., per reference numeral 1714), until, for example, it is determined that the state of the sensor component is to be changed to the on state. The sensor management component can switch the sensor component from the on state to the off state, in response to determining that the adjusted pulse signal level Q(j) is less than the defined threshold inactive level (e.g., I_threshold).

If, at operation 1710, it is determined that the adjusted pulse signal level Q(j) is not less than the defined threshold inactive level, the method 1700 can proceed to operation 1714, wherein, at 1714, it can be determined that the sensor component is to remain in its current on state. The sensor management component can determine that the sensor component is to remain in its current on state, in response to determining that the adjusted pulse signal level Q(j) is not less than the defined threshold inactive level (e.g., I_threshold).

One or more methods disclosed throughout the subject specification and annexed drawings are capable of being stored on an article of manufacture to facilitate transporting and transferring such method(s) to computers or chipsets with processing capability(ies) for execution, and thus implementation, by a processor, or for storage in a memory. In an aspect, one or more processors that enact method(s) described herein can be employed to execute computer-executable code instructions retained in a memory, or any computer-readable or machine-readable medium, to implement method(s) described herein; the code instructions, when executed by the one or more processor implement or carry out the various acts in the method(s) described herein. The computer-executable code instructions provide a computer-executable or machine-executable framework to enact, or implement, the method(s) described herein.

Figure 18:
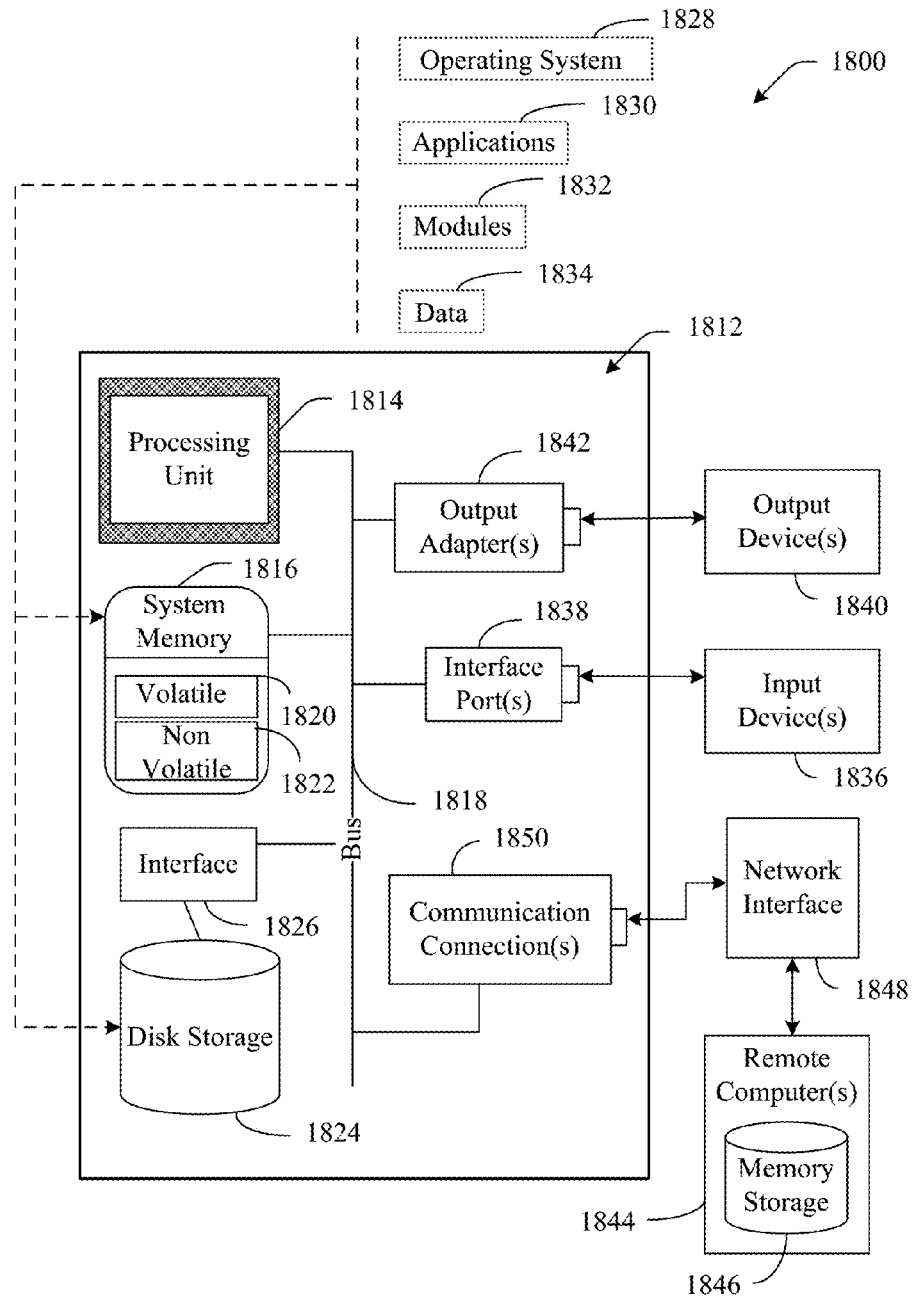
FIG. 18 depicts a block diagram of a computer operable to execute the disclosed architecture.

Referring now to FIG. 18, there is illustrated a block diagram of a computer operable to execute the disclosed architecture. In order to provide additional context for various aspects thereof, FIG. 18 and the following discussion are intended to provide a brief, general description of a suitable computing environment 1800 in which the various aspects of the disclosed subject matter can be implemented. While the description above is in the general context of computer-executable instructions that may run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter also can be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

A computer and computing devices in general typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 18, the example environment 1800 for implementing various aspects includes a computer 1802, the computer 1802 including a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors and other multi-processor architectures may also be employed as the processing unit 1804.

The system bus 1808 can be any of several types of bus structure that may further interconnect to a memory bus (with or without a memory controller), a peripheral bus, and a local bus using any of a variety of commercially available bus architectures. The system memory 1806 includes read-only memory (ROM) 1810 and random access memory (RAM) 1812. A basic input/output system (BIOS) is stored in a non-volatile memory 1810 such as ROM, EPROM, EEPROM, which BIOS contains the basic routines that help to transfer information between elements within the computer 1802, such as during start-up. The RAM 1812 can also include a high-speed RAM such as static RAM for caching data.

The computer 1802 further includes an internal hard disk drive (HDD) 1814 (e.g., EIDE, SATA), which internal hard disk drive 1814 may also be configured for external use in a suitable chassis (e.g., external DDD), a magnetic floppy disk drive (FDD) 1816, (e.g., to read from or write to a removable diskette 1818) and an optical disk drive 1820, (e.g., reading a CD-ROM disk 1822 or, to read from or write to other high capacity optical media such as the DVD). The hard disk drive 1814, magnetic disk drive 1816 and optical disk drive 1820 can be connected to the system bus 1808 by a hard disk drive interface 1824, a magnetic disk drive interface 1826 and an optical drive interface 1828, respectively. The interface 1824 for external drive implementations includes at least one or both of Universal Serial Bus (USB) and IEEE 1394 interface technologies. Interface 1824 enables functional coupling of computer 1802 to a removable memory, such as a USB memory device or a SD memory card. Other external drive connection technologies are within contemplation of the disclosed subject matter.

The drives and their associated computer-readable media provide nonvolatile storage of data, data structures, computer-executable instructions, and so forth. For the computer 1802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the disclosed subject matter.

A number of program modules can be stored in the drives and RAM 1812, including an operating system 1830, one or more application programs 1832, other program modules 1834 and program data 1836. All or portions of the operating system, applications, modules, and/or data can also be cached in the RAM 1812. It is to be appreciated that the disclosed subject matter can be implemented with various commercially available operating systems or combinations of operating systems.

A user can enter commands and information into the computer 1802 through one or more wired/wireless input devices, e.g., a keyboard 1838 and a pointing device, such as a mouse 1840. Other input devices (not shown) may include a microphone, an IR remote control, a joystick, a game pad, a stylus pen, touch screen, or the like. These and other input devices are often connected to the processing unit 1804 through an input device interface 1842 that is coupled to the system bus 1808, but can be connected by other interfaces, such as a parallel port, an IEEE 1394 serial port, a game port, a USB port, an IR interface, etc.

A monitor 1844 or other type of display device is also connected to the system bus 1808 via an interface, such as a video adapter 1846. In addition to the monitor 1844, a computer typically includes other peripheral output devices (not shown), such as speakers, printers, etc.

The computer 1802 may operate in a networked environment using logical connections via wired and/or wireless communications to one or more remote computers, such as a remote computer(s) 1848. The remote computer(s) 1848 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1850 is illustrated. The logical connections depicted include wired/wireless connectivity to a local area network (LAN) 1852 and/or larger networks, e.g., a wide area network (WAN) 1854. Such LAN and WAN networking environments are commonplace in offices and companies, and facilitate enterprise-wide computer networks, such as intranets, all of which may connect to a global communications network, e.g., the Internet.

When used in a LAN networking environment, the computer 1802 is connected to the local network 1852 through a wired and/or wireless communication network interface or adapter 1856. The adaptor 1856 may facilitate wired or wireless communication to the LAN 1852, which may also include a wireless access point disposed thereon for communicating with the wireless adaptor 1856.

When used in a WAN networking environment, the computer 1802 can include a modem 1858, or is connected to a communications server on the WAN 1854, or has other means for establishing communications over the WAN 1854, such as by way of the Internet. The modem 1858, which can be internal or external and a wired or wireless device, is connected to the system bus 1808 via the serial port interface 1842. In a networked environment, program modules depicted relative to the computer 1802, or portions thereof, can be stored in the remote memory/storage device 1850. It will be appreciated that the network connections shown are illustrative and other means of establishing a communications link between the computers can be used.

The computer 1802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4, 3.6, and 5 GHz radio bands, at up to an 11 Mbps (802.11a), 54 Mbps (802.11b or 802.11b), or 150 Mbps (802.11n) data rate, for example, or with products that contain both bands (dual band), so the networks can provide real-world performance similar to the basic 10BaseT wired Ethernet networks used in many offices.

Figure 19:
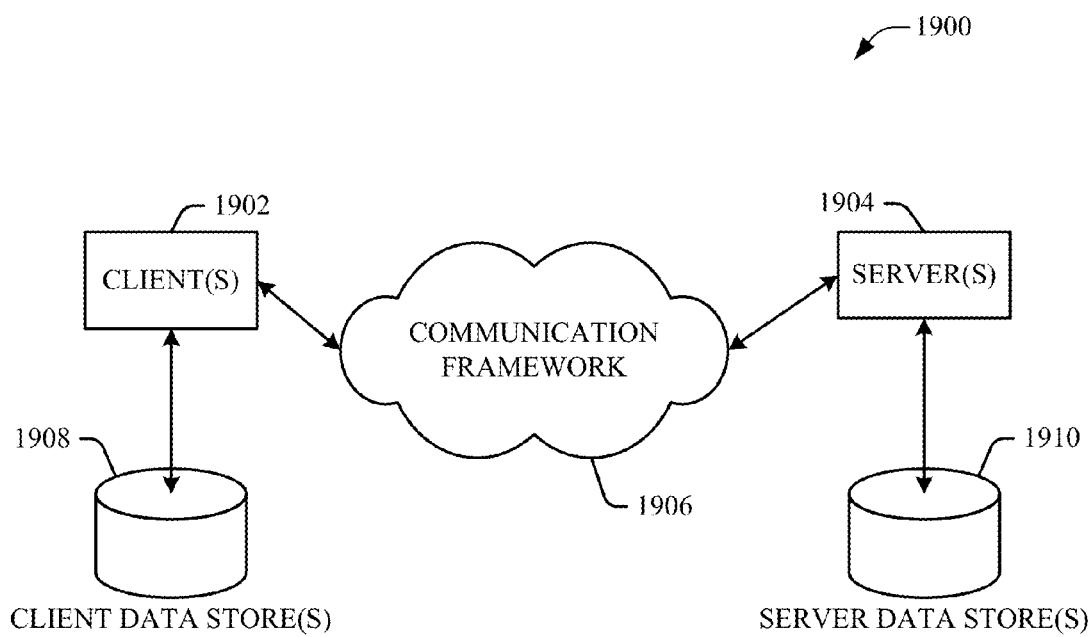
FIG. 19 illustrates a schematic block diagram of an example computing environment.

Referring now to FIG. 19, there is illustrated a schematic block diagram of an example computing environment 1900 in accordance with another aspect. The system 1900 includes one or more client(s) 1902. The client(s) 1902 can be hardware and/or software (e.g., threads, processes, computing devices). The client(s) 1902 can house cookie(s) and/or associated contextual information by employing the disclosed subject matter, for example.

The system 1900 also includes one or more server(s) 1904. The server(s) 1904 can also be hardware and/or software (e.g., threads, processes, computing devices, etc.). The servers 1904 can house threads to perform transformations by employing the invention, for example. One possible communication between a client 1902 and a server 1904 can be in the form of a data packet adapted to be transmitted between two or more computer processes. The data packet may include a cookie and/or associated contextual information, for example. The system 1900 includes a communication framework 1906 (e.g., a global communication network such as the Internet) that can be employed to facilitate communications between the client(s) 1902 and the server(s) 1904.

Communications can be facilitated via a wired (including optical fiber) and/or wireless technology. The client(s) 1902 are operatively connected to one or more client data store(s) 1908 that can be employed to store information local to the client(s) 1902 (e.g., cookie(s) or associated contextual information). Similarly, the server(s) 1904 are operatively connected to one or more server data store(s) 1910 that can be employed to store information local to the servers 1904.

As used in this application, the terms "component," "system," "platform," "layer," "controller," "terminal," "station," "node," "interface", "HMI", "client", and the like, can refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

In accordance with various embodiments, one or more controllers can be employed in industrial automation system (e.g., an industrial control system). A controller can be embodied in a programmable automation controller (PAC), which can be a dedicated programmable logic controller (PLC), a personal computer (PC)-based controller, or the like. It is to be noted that a controller (e.g., PLC) can be a dedicated piece of hardware that is self contained or, in the case of a "soft controller" (e.g., "soft PLC"), a piece of software that runs on a computer and provides controller-like control. For instance, in the case of a soft controller, code can be extracted by the soft controller to access a project database directly to extract name information.

A terminal can communicate with the controller and/or other devices, such as an input/output (I/O) module, drives, motion controllers, process instruments, sensors, etc., in or associated with a control platform associated with the industrial control system. Control code and control data structures in the control platform can represent control logic that can administer equipment, and related processes, functionally coupled to the control platform. In an aspect, control platform is an industrial automation control environment and the control logic is automation control logic. To facilitate operation of the control system, control logic can be developed during design time, wherein the control logic can be implemented (e.g., executed) at run time. During design time (e.g., in the design environment), in an aspect, instruction(s), data type(s), and metadata tag(s) that comprise control code can be produced and retained as part of configuration, or composition, of a control project or application for use in operations for the control system (e.g., during run time).

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the terms "set" or "subset" as employed herein exclude the empty set; e.g., the set with no elements therein. Thus, a "set" or a "subset" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features have been presented herein in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

In the subject specification and annexed drawings, terms such as "repository," "store," "data store," "data storage," and substantially any term(s) that conveys any other information storage component(s) relevant to operation and functionality of a functional element or component described herein, can refer to "memory components," or entities embodied in a "memory" or components comprising the memory. The memory components described herein can be either volatile memory or nonvolatile memory, or can include both volatile and nonvolatile memory. In addition, the memory components described herein can be statically affixed (screwed, bolted, soldered, etc.) or removably affixed. Further, the memory components can include computer-readable or machine-readable storage media.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of further illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device (e.g., a PAC), discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the operations or acts of a method or algorithm described in connection with the aspects disclosed herein can be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal or HMI. In the alternative, the processor and the storage medium may reside as discrete components in a user terminal or HMI. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

What has been described above includes examples of the disclosed subject matter. It is, of course, not possible to describe every conceivable combination of components and/or methods, but one of ordinary skill in the art may recognize that many further combinations and permutations are possible. Accordingly, the disclosed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a memory that stores computer-executable components;
a processor, operatively coupled to the memory, that executes computer-executable components, the computer-executable components comprising:
a sensor component that is transitioned between an off state and an on state based at least in part on a pulse signal received by the sensor component; and
a sensor management component that determines a pulse amplitude of a pulse in the pulse signal as a function of a pulse sample amplitude and an adjustment amplitude, wherein the adjustment amplitude is determined as a function of at least a pre-pulse sample amplitude, a post-pulse sample amplitude, and a defined factor, and wherein the sensor management component controls the transition of the sensor component between the off state and the on state based at least in part on the pulse amplitude of the pulse.

2. The system of claim 1, wherein the pulse signal is a light pulse signal.

3. The system of claim 1, wherein, as part of the determination of the pulse amplitude, the sensor management component determines the pulse amplitude of the pulse as a function of the pulse sample amplitude, the pre-pulse sample amplitude, and the post-pulse sample amplitude.

4. The system of claim 3, wherein, as part of the determination of the pulse amplitude, the sensor management component determines the pulse amplitude of the pulse as being equal to the pulse sample amplitude minus one-half of a total of the pre-pulse sample amplitude plus the post-pulse sample amplitude to facilitate mitigation of light noise in a portion of the pulse signal that contains the pulse, wherein the pre-pulse sample amplitude and the post-pulse sample amplitude provide the sensor management component an indication of an amount of the light noise to be mitigated.

5. The system of claim 1, wherein the sensor management component samples the pulse signal at a first time that occurs between a prior pulse of the pulse signal and the pulse to facilitate generation of the pre-pulse sample, samples the pulse signal at a second time that occurs a pulse period for the pulse to facilitate generation of the pulse sample, and samples the pulse signal at a third time that occurs after the pulse and before next pulse in the pulse signal to facilitate generation of the post-pulse sample.

6. The system of claim 1, wherein the sensor management component analyzes a subset of pulses comprising the pulse and at least one other pulse, determines whether the pulse and the at least one other pulse satisfy a defined threshold pulse level for placing the sensor component in the on state, and transitions the sensor component to or maintains the sensor component in the on state in response to determining that the pulse and the at least one other pulse each satisfy the defined threshold pulse level.

7. The system of claim 6, wherein pulses in the subset of pulses are in consecutive order in the pulse signal.

8. The system of claim 1, wherein the sensor management component determines a sequence of a defined number of pulses, comprising the pulse, and determines a pulse signal strength associated with the sequence based at least in part on respective pulse amplitudes of respective pulses of the sequence.

9. The system of claim 8, wherein the sensor management component determines a defined pulse amplitude range for good pulses based at least in part on the respective pulse amplitudes of the respective pulses of the sequence, in accordance with a defined sensor state criterion.

10. The system of claim 9, wherein the sensor management component determines a first subset of the respective pulses that are good pulses based at least in part on the first subset of the respective pulses having a first subset of the respective pulse amplitudes that are within the defined pulse amplitude range, and determines a second subset of the respective pulses that are outlier pulses based at least in part on the second subset of the respective pulses having a second subset of the respective pulse amplitudes that are outside of the defined pulse amplitude range.

11. The system of claim 10, wherein the sensor management component modifies at least one pulse amplitude of the second subset of the respective pulse amplitudes to a modified pulse amplitude that is equal to an average pulse amplitude of the first subset of the respective pulse amplitudes.

12. The system of claim 11, wherein the sensor management component determines an adjusted pulse signal strength associated with the sequence based at least in part on the first subset of the respective pulse amplitudes and the at least one modified pulse amplitude.

13. The system of claim 12, wherein the sensor management component determines whether there is a sufficient number of the good pulses in the sequence based at least in part on a defined threshold number of good pulses for determining whether the sequence is usable to facilitate determining whether to transition the state of the sensor component, and determines a state of the sensor component in response to determining that there is the sufficient number of the good pulses in the sequence.

14. The system of claim 13, wherein it is determined that the state of the sensor component is the off state, and wherein the sensor management component determines whether the adjusted pulse signal strength is greater than a defined threshold active level associated with the on state of the sensor component, and transitions the sensor component from the off state to the on state in response to determining that the adjusted pulse signal strength is greater than the defined threshold active level, or maintains the sensor component in the off state in response to determining that the adjusted pulse signal strength is not greater than the defined threshold active level.

15. The system of claim 1, wherein a first portion of the pulse signal comprises a set of pulses and a second portion of the pulse signal comprises a set of pulse absences, and wherein the set of pulses is associated with having the sensor component in one of the off state or the on state, and the set of pulse absences is associated with having the sensor component in another one of the off state or the on state.

16. The system of claim 1, wherein the sensor component comprises at least one of a light sensor, a light-emitting-diode sensor, an infra-red sensor, a photodiode, a photoelectric sensor, a photoswitch, a diffuse sensor, or a polarized retro reflective sensor.

17. The system of claim 1, wherein the sensor component further comprises:
a transmitter component that emits the pulse signal, wherein the pulse signal comprises pulses and pulse absences that respectively occur during pulse periods in the pulse signal; and
a receiver component that receives the pulse signal.

18. A method, comprising:
determining a pulse sample value and at least a pre-pulse sample value and a post-pulse sample value that are associated with a portion of a pulse signal received in connection with a sensor, wherein the portion of the pulse signal comprises a pulse period that contains a pulse or a pulse absence; and
determining a pulse value of the pulse or a pulse absence value of the pulse absence as a function of the pulse sample value and an adjustment sample value, to facilitate determining a state in which the sensor is to be in response to the pulse or the pulse absence, wherein the adjustment sample value is determined as a function of at least the pre-pulse sample value, the post-pulse sample value, and a defined factor value.

19. The method of claim 18, further comprising:
controlling switching of the sensor between a first state and a second state based at least in part on the pulse value of the pulse or the pulse absence value of the pulse absence.

20. The method of claim 18, wherein the determining the pulse value of the pulse or the pulse absence value of the pulse absence further comprises:
determining the pulse value or the pulse absence value as being equal to the pulse sample value minus one-half of a total of the pre-pulse sample value plus the post-pulse sample value to facilitate mitigating light noise in a portion of the pulse signal that contains the pulse or the pulse absence, wherein the pre-pulse sample value and the post-pulse sample value provide an indication of an amount of the light noise to be mitigated.

21. The method of claim 18, further comprising:
sampling the pulse signal at a first time that occurs between a last pulse period of the pulse signal and a pulse period of the pulse signal associated with the pulse or the pulse absence;
generating the pre-pulse sample value based at least in part on the sampling of the pulse signal at the first time;
sampling the pulse signal at a second time that occurs during the pulse period;
generating the pulse sample value based at least in part on the sampling of the pulse signal at the second time;
sampling the pulse signal at a third time that occurs after the pulse period and before next pulse period in the pulse signal; and
generating the post-pulse sample value based at least in part on the sampling of the pulse signal at the third time.

22. The method of claim 18, wherein the sensor is in an off state, the method further comprising:
analyzing a subset of pulses comprising the pulse and at least one other pulse that are in consecutive order;
determining whether the pulse and the at least one other pulse satisfy a defined threshold pulse level for placing the sensor in an on state; and
switching the sensor to the on state in response to determining that the pulse and the at least one other pulse each satisfy the defined threshold pulse level.

23. The method of claim 18, further comprising:
from the pulse signal, determining a sequence of a defined number of pulses, comprising the pulse; and
determining a pulse signal strength associated with the sequence based at least in part on respective pulse values of respective pulses of the sequence, wherein the respective pulse values are determined as a function of at least one of their respectively associated pre-pulse values or respectively associated post-pulse values.

24. The method of claim 23, further comprising:
determining a defined pulse value range for acceptable pulses based at least in part on the respective pulse values of the respective pulses of the sequence, in accordance with a defined sensor state criterion;
identifying a first subset of the respective pulses that are the acceptable pulses based at least in part on the first subset of the respective pulses having a first subset of the respective pulse values that are within the defined pulse value range; and
identifying a second subset of the respective pulses that are outlier pulses based at least in part on the second subset of the respective pulses having a second subset of the respective pulse values that are outside of the defined pulse value range.

25. The method of claim 24, further comprising:
setting the respective pulse values of the second subset of the respective pulse values to zero;
determining an average pulse value of the first subset of the respective pulse values;
changing each of the respective pulse values of the second subset of the respective pulse values to an adjusted pulse value that corresponds to the average pulse value; and
determining an adjusted pulse signal strength associated with the sequence as a function of the first subset of the respective pulse values and the adjusted pulse values of the second subset of the respective pulse values.

26. The method of claim 25, further comprising:
identifying whether there is a number of the acceptable pulses in the sequence that satisfies a defined threshold number of acceptable pulses for determining whether the sequence is usable to facilitate determining whether to switch the state of the sensor; and
determining the state of the sensor in response to determining that there is the number of the acceptable pulses in the sequence satisfies the defined threshold number of acceptable pulses.

27. The method of claim 26, further comprising:
determining that the state of the sensor is the off state;
determining whether the adjusted pulse signal strength is greater than a defined threshold active level associated with the on state of the sensor; and
at least one of:
switching the sensor from the off state to the on state in response to determining that the adjusted pulse signal strength is greater than the defined threshold active level, or
maintaining the sensor in the off state in response to determining that the adjusted pulse signal strength is not greater than the defined threshold active level.

28. A non-transitory computer-readable medium storing instructions that, in response to execution, cause a system comprising a processor to perform operations, comprising:
determining a pulse sample level and at least a pre-pulse sample level and a post-pulse sample level that are associated with a portion of a pulse signal received in connection with a sensor, wherein the portion of the pulse signal comprises a pulse period in which a pulse or a pulse absence is able to occur; and determining a pulse level of the pulse or a pulse absence level of the pulse absence based at least in part on the pulse sample level and an adjustment sample level, to facilitate determining a state in which the sensor is to be in response to the pulse or the pulse absence, wherein the adjustment sample level is determined based at least in part on at least the pre-pulse sample level, the post-pulse sample level, and a factor.

29. The non-transitory computer-readable medium of claim 28, wherein the operations further comprise:

controlling switching of the sensor between an on state and an off state based at least in part on the pulse level of the pulse or the pulse absence level of the pulse absence.

* * * * *